United States Patent [19]

Hicks, Jr.

[11] Patent Number: 4,837,631

[45] Date of Patent: Jun. 6, 1989

[54] ELECTRONIC STILL CAMERA TUBE

[75] Inventor: John W. Hicks, Jr., Northboro, Mass.

[73] Assignee: Peter D. Sahagen, New York, N.Y.

[21] Appl. No.: 191,862

[22] Filed: May 9, 1988

Related U.S. Application Data

[63] Continuation-in-part of Ser. No. 96,623, Sep. 14, 1987.

[51] Int. Cl.[4] .............................................. H04N 5/30

[52] U.S. Cl. .................................... 358/217; 358/110; 250/213 VT

[58] Field of Search .................... 358/217, 211, 213.11, 358/110; 250/213 VT

[56] References Cited

U.S. PATENT DOCUMENTS

| | | | |
|---|---|---|---|
| 3,353,114 | 11/1967 | Hanks et al. | 357/4 |
| 4,059,840 | 11/1977 | van de Polder et al. | 357/217 |
| 4,471,378 | 9/1984 | Ng | 358/217 |
| 4,555,731 | 11/1985 | Zinchuk | 358/211 |
| 4,727,427 | 2/1988 | Kime | 358/217 |

*Primary Examiner*—Jin F. Ng

*Assistant Examiner*—Stephen Brinich

*Attorney, Agent, or Firm*—Wolf, Greenfield & Sacks

[57] ABSTRACT

An electronic camera tube includes a transparent envelope enclosing an evacuated cavity, a photocathode layer on a first internal surface of the envelope and an array of storage electrodes on a second internal surface of the envelope. The first and second surfaces are parallel and closely spaced. The photocathode layer emits electrons in response to an incident light intensity pattern. The storage electrodes in the array receive the electrons from the photocathode layer and emit secondary electrons, thereby accumulating a charge pattern representing the light intensity pattern. The camera tube further includes a readout device associated with each storage electrode for reading out the charge pattern during a readout phase. The readout devices operate by generating a readout current through an evacuated region adjacent to each storage electrode. Each readout current is a function of the charge accumulated on the adjacent storage electrode during the exposure phase. A number of different readout techniques can be utilized.

29 Claims, 11 Drawing Sheets

FIG. 5
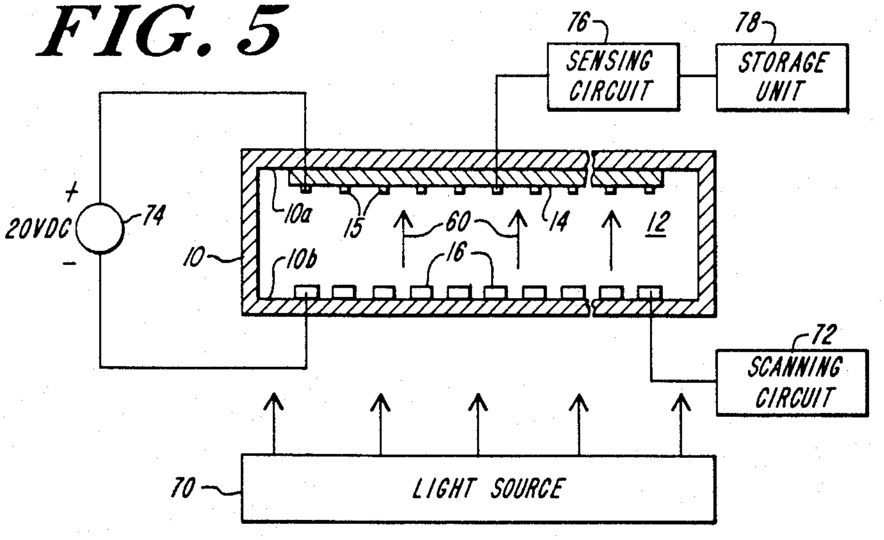
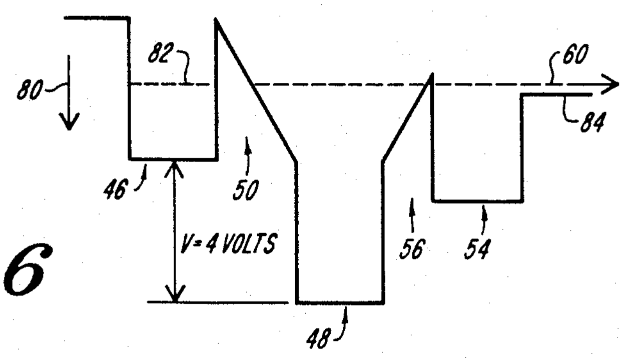
FIG. 6
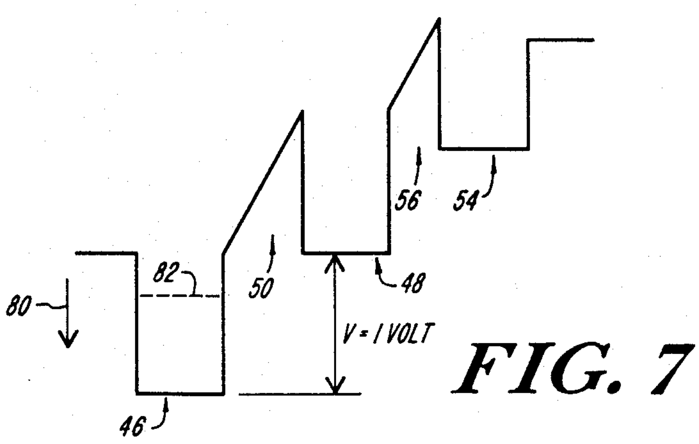
FIG. 7

ELECTRONIC STILL CAMERA TUBE

CROSS REFERENCE TO RELATED APPLICATION

This application is a continuation-in-part of pending application Ser. No. 096,623 filed Sept. 14, 1987.

FIELD OF THE INVENTION

This invention relates to an electronic camera tube primarily for use in still photography and also for use in high resolution movie photography and, more particularly, to a camera tube utilizing temporary storage in an array of cells of a charge pattern representing a light intensity pattern and subsequent readout of the charge pattern. During readout, the cells in the array are addressed, and the charge on each cell controls a readout current.

BACKGROUND OF THE INVENTION

It has been an object of recent research to provide an electronic camera which is practical for the consumer market. Such a camera must be relatively low in cost and small in size and must have an acceptable level of sensitivity and resolution. In addition, the electronic camera must store the image for readout either immediately or at a later time. Such a camera eliminates the inconvenience and expense of conventional film.

Most prior art electronic cameras have been designed for television or video use. Such cameras have resolutions of about 500 pixels across a frame which is below the resolution people expect in a still photograph. In addition, these cameras are extremely noisy. When this noise is averaged over several frames, as is the case with movie photography, it is acceptable. However, the noise level is unacceptable for a single frame. Recent electronic still cameras have low resolution, high price, or both.

It is an object of the present invention to provide a novel electronic camera tube.

It is another object of the present invention to provide a electronic camera tube including an array of cells for storing a charge pattern representative of a light intensity pattern and a readout device associated with each of the cells.

It is a further object of the present invention to provide an electronic camera tube including an array of cells for storing a charge pattern representative of a light intensity pattern and a readout device associated with each cell wherein a readout current is controlled by the charge on the associated cell.

It is another object of the present invention to provide a camera tube including an array of cells for storing a charge pattern representative of a light intensity pattern, each of the cells relying upon the generation and displacement of secondary electrons for accumulating an electrical charge.

It is still another object of the present invention to provide an electronic camera tube including an array of cells for storing a charge pattern representative of a light intensity pattern wherein the charge pattern is read out perpendicular to the cell array.

It is yet another object of the present invention to provide an electronic camera tube having high sensitivity and high operating speed.

It is still another object of the present invention to provide an electronic camera tube which is relatively small in size.

SUMMARY OF THE INVENTION

According to the present invention, these and other objects and advantages are achieved in a camera tube comprising means for emitting electrons having a spatial variation representative of an incident light intensity pattern when exposed to light in a predetermined wavelength range, an array of storage electrodes each capable of storing an electrical charge in response to the electrons from the electron-emitting means, means for accelerating electrons from the electron-emitting means to the array of storage electrodes during exposure, a sealed and evacuated envelope surrounding the electron-emitting means and the array of storage electrodes, and readout means for sensing the charge on each of the storage electrodes in the array during a readout phase after exposure. The readout means comprises a readout device associated with each storage electrode in the array. Each readout device includes means for generating a readout current in the evacuated region adjacent to the storage electrode and means for collecting the readout current to provide a readout signal. Each readout current has a magnitude that is a function of the charge on the adjacent storage electrode so that the readout signals collectively represent the charge pattern.

Preferably, the electron-emitting means comprises a photocathode layer that emits electrons in response to an incident light pattern from an object being photographed, and the storage electrodes in the array each comprise a thin, metal layer that emits secondary electrons and assumes a more positive potential when bombarded by energetic electrons from the photocathode layer. The storage electrodes act as pixels that store charges collectively representative of a light intensity pattern. Preferably, the array of storage electrodes is a rectilinear array of rows and columns and may include 4,000 rows and 4,000 columns.

Preferably, the means for generating the readout current comprises row electrodes, each of which is aligned with one of the rows of storage electrodes and ultraviolet source means for directing ultraviolet radiation at the row conductors. In one preferred readout technique, the ultraviolet source means includes means for illuminating the entire array during readout, and the camera tube further includes means for selectively addressing the readout devices for sequential readout. In another preferred readout technique, the ultraviolet source means includes means for illuminating a selected row electrode with a line beam and means for sequentially scanning the line beam over the row electrodes, and the camera tube further includes means for selectively addressing readout devices associated with the selected row electrode. In yet another preferred readout technique, the ultraviolet source means includes means for illuminating a selected row electrode with a line beam for parallel readout of the readout devices associated with the selected row electrode and means for sequentially scanning the line beam over the row electrodes. In still another preferred readout technique, the ultraviolet source means includes means for illuminating a selected readout device with a spot beam and means for sequentially scanning the spot beam over the readout devices in the array.

According to one preferred embodiment, the means for collecting the readout current includes column electrodes, each of which is aligned with one of the columns of storage electrodes. The column electrodes are perpendicular to the row electrodes and are typically coplanar with the storage electrodes in the array. In another preferred embodiment, the means for collecting the readout current includes readout electrode means on the opposite side of the envelope from the array of storage electrodes.

In all of the above embodiments, the readout current travels through an evacuated region adjacent to the associated storage electrode. The charge accumulated on the storage electrode during exposure influences the magnitude of the readout current. As a result, the readout current is a function of the incident light intensity on a pixel, and the readout signals from the array collectively represent the light intensity pattern.

In a preferred embodiment, the column electrodes and the array of storage electrodes are coplanar and are supported by a substrate. The substrate includes parallel, spaced-apart channels under rows of storage electrodes, and the row electrodes are disposed in the channels. The channels define between them ridges that support the storage electrodes and the column electrodes.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 5 is a block diagram of the camera tube readout operation wherein photoelectrons are used for readout;

FIG. 6 is an energy diagram of an addressed tunnel device which uses photoelectrons for readout and which has a lowered work function on the outer surface of the third electrode;

FIG. 7 is an energy diagram of a tunnel device which is not addressed;

DETAILED DESCRIPTION OF THE INVENTION

Figure 1:
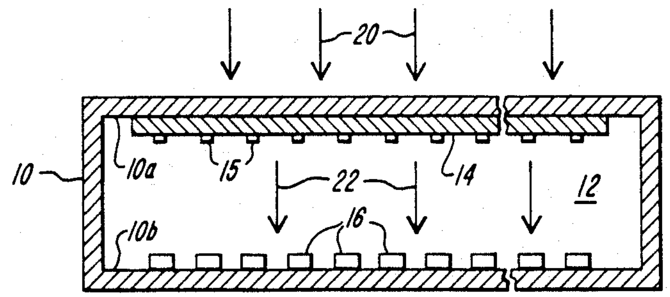
FIG. 1 is an enlarged cross-sectional view of a camera tube in accordance with the present invention.

An electronic camera tube in accordance with the present invention is shown in simplified form in FIG. 1. A transparent envelope 10 encloses an evacuated cavity 12 having a pressure such that the mean free path of electrons is much longer than the path between the two surfaces 10*a* and 10*b*. The envelope 10 includes internal surfaces 10*a*, 10*b* which are substantially parallel to each other and which are spaced apart by a distance on the order of 10 to 100 micrometers. A photocathode layer 14, such as a type S-20 or a multi-alkali photocathode material, is adhered to the internal surface 10*a* of envelope 10. When the photocathode layer 14 is exposed to light in a predetermined wavelength range, it emits electrons having a spatial variation representative of the incident light intensity pattern. Located on the opposite internal surface 10*b* is an array of cells 16. Preferably, the array of cells 16 is arranged in a matrix of rows and columns. Electrical connections are made through envelope 10 to the photocathode layer 14 and to the array of cells 16 by conventional vacuum feedthroughs.

A plurality of readout electrodes 15 is located on the inside surface of the photocathode layer 14. Preferably, the readout electrodes 15 are conductive strips parallel to either the rows or the columns of the cell array and equal in number to either the rows or the columns of cells. Thus, one conductive strip parallels each row or each column of the cell array.

In basic operation, a light intensity pattern 20 is directed by a suitable lens system (not shown) through transparent envelope 10 to photocathode layer 14, causing emission of electrons 22 therefrom. The electrons 22 are accelerated by an applied bias voltage of about 1000 volts across the evacuated cavity 12 to the array of cells 16. The electrons 22 cause a charge pattern representative of the light intensity pattern 20 to be formed and stored on the cells 16. The charge pattern is read out from the cells 16, as described in detail hereinafter, to provide an electronic representation of the incident light intensity pattern.

Figure 2:
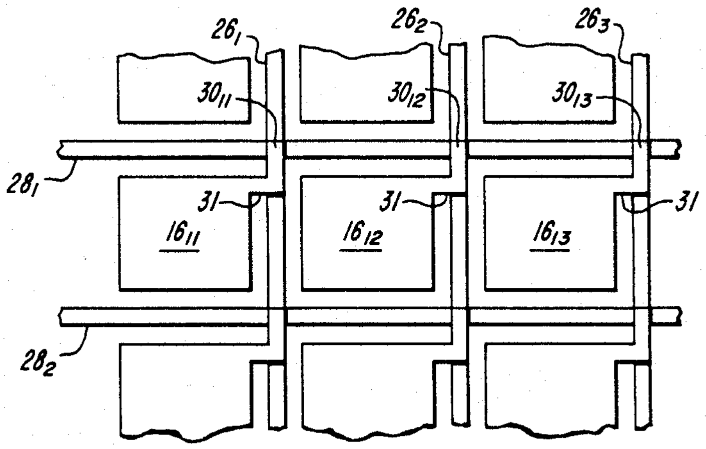
FIG. 2 is an enlarged partial plan view of a cell array for storing a charge pattern.

A partial view of the cell array illustrating cells $16_{11}$, $16_{12}$ and $16_{13}$ is shown in FIG. 2. Column conductors $26_1$, $26_2$, $26_3$ and row conductors $28_1$, $28_2$ are spaced apart to define a grid. Cells $16_{11}$, $16_{12}$, $16_{13}$ are located in the spaces between the conductors 26, 28. At each intersection between the column conductors 26 and the row conductors 28 is a readout device 30. At the intersection of column conductor $26_1$ and row conductor $28_1$ is readout device $30_{11}$; at the intersection of column conductor $26_2$ and row conductor $28_1$ is readout device $30_{12}$; and at the intersection of column conductor $26_3$ and row conductor $28_1$ is readout device $30_{13}$. The cells $16_{11}$, $16_{12}$, $16_{13}$ are connected to readout device $30_{11}$, $30_{12}$, $30_{13}$, respectively, by conductive strips 31. The array containing the above-described structure extends in two dimensions with a desired number of elements. Preferably, the cells 16 have a dimension on the order of 5 micrometers on a side, and conductors 26, 28 are about 0.5 to 1.0 micrometer wide. The array typically contains 5000×5000 elements or pixels. A cell 16, a readout device 30 and the associated row and column conductors 28, 26 comprise a pixel.

Figure 3:
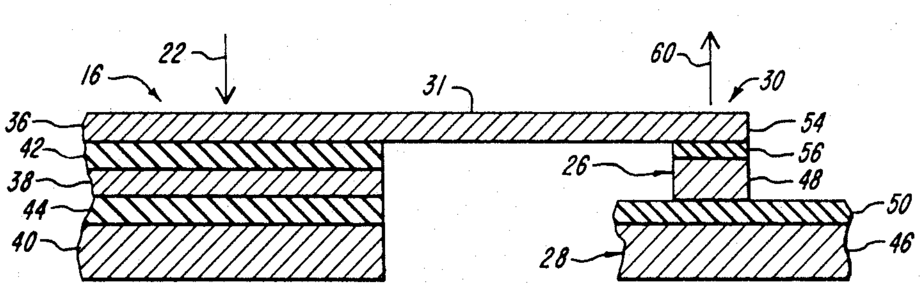
FIG. 3 is an enlarged cross-sectional view of a cell and a readout device.

A cross-sectional view of a preferred cell 16 and readout device 30 is shown in FIG. 3. Cell 16 includes an upper electrode 36, an intermediate electrode 38 and a lower electrode 40. The upper electrode 36 and the intermediate electrode 38 are separated by an insulating layer 42, and the intermediate electrode 38 is separated from the lower electrode 40 by an insulating layer 44. The electrodes 36 and 38 are preferably aluminum layers each having a thickness on the order of 100 angstroms, while the lower electrode 40 is preferably aluminum having a thickness of 1,000 angstroms or more. The insulating layers 42, 44 are preferably aluminum oxide having a thickness in the range of 30–60 angstroms each. Although the example of FIG. 3 includes three electrodes separated by insulating layers, 2 to 20 electrodes can be used, and each pair of electrodes is separated by an insulating layer.

When energetic electrons 22 from photocathode layer 14 impinge on upper electrode 36, they cause generation of energetic secondary electrons which have a primary velocity component toward insulating layer 42. Some fraction of the secondary electrons are driven through the insulating layer 42 to intermediate electrode 38 where additional secondary electrons are generated. A fraction of those secondary electrons are driven from intermediate electrode 38 through insulating layer 44 to lower electrode 40. As a result of secondary electron displacement, upper electrode 36 becomes positively charged relative to its initial charge. The charge accumulated on upper electrode 36 is representative of the number of incident primary electrons 22 which, in turn, is representative of the light intensity pattern 20 incident upon photocathode layer 14. Thus, the charge pattern stored on the array of cells 16 is representative of the light intensity pattern 20.

The readout device 30 includes a first conductive layer 46 comprising a segment of one of the row conductors 28 and a second conductive layer 48 comprising a segment of one of the column conductors 26. The overlapping areas of conductors 26 and 28 at their intersection determine the area of the readout device 30. The cross-sectional view of readout device 30 shown in FIG. 3 is viewed in the direction of column conductor 26. The first and second layers 46, 48 of the readout device are separated by an insulating first oxide layer 50. The upper electrode 36 of cell 16 is connected by conductive strip 31 to the intersection of conductors 26 and 28 as shown in FIG. 2 to form a third conductive layer 54 of the readout device 30. The third conductive layer 54 is separated from the second conductive layer 48 by an insulating second oxide layer 56. Preferably, the conductive layers 46, 48, 54 of readout device 30 are aluminum each having a thickness on the order of 30 angstroms, and the oxide layers 50, 56 are aluminum oxide each having a thickness on the order of 10 angstroms.

The readout device 30 operates on the tunneling principle, but is different from known tunneling devices. A selected readout device 30 in the array is addressed by application of appropriate bias voltages to the corresponding column conductor 26 and row conductor 28. The required bias voltages are described in detail hereinafter. Energetic photoelectrons are generated in first conductive layer 46 by application of light from an external light source. Alternatively, thermal electrons or free electrons in conductive layer 46 can be utilized as the source of tunneling electrons. The electrons have a probability of tunneling through oxide layer 50 to second conductive layer 48 and then have a probability of tunneling from second conductive layer 48 through oxide layer 56 to third conductive layer 54. The magnitude of the potential barrier between conductive layers 48 and 54, and thereby the probability of electrons tunneling through that barrier, is controlled by the voltage on conductive layer 54. As discussed previously, conductive layer 54 is connected to the upper electrode 36 of a cell in the array and stores a charge representative of the light incident upon a portion of the photocathode layer 14 opposite that cell. By depositing a material of lower work function on the upper surface of conductive layer 54 or by suitable biasing of conductive layers 46, 48, 54, the electrons which tunnel through oxide layer 56 pass directly through conductive layer 54 and are injected into the evacuated cavity 12 as an electron beam 60. The current level of electron beam 60 is representative of the charge previously stored on cell 16 in response to an incident light intensity pattern.

Figure 4:
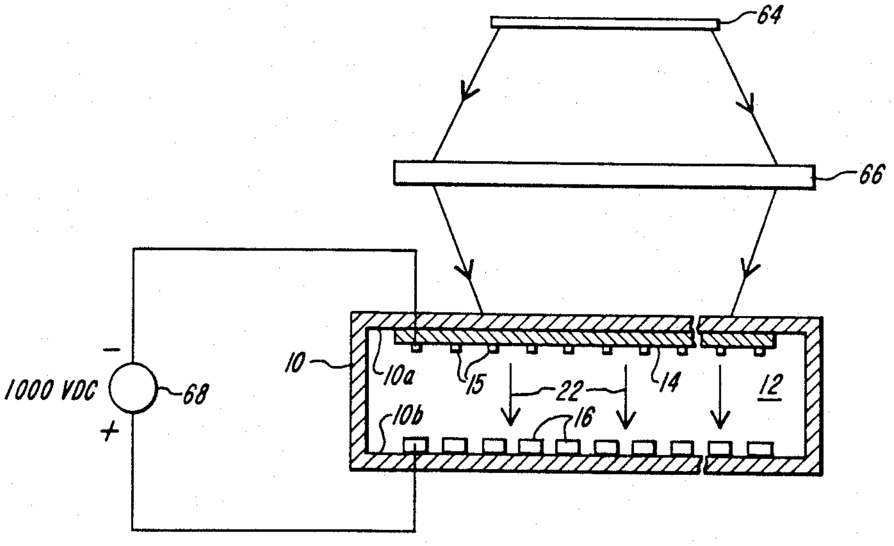
FIG. 4 is a block diagram of the camera tube operation during the exposure phase.

Operation of the camera tube involves an exposure phase as illustrated in FIG. 4 and a readout phase as illustrated in FIG. 5. During the exposure phase, an object 64 or scene to be photographed, is focused by a lens system 66 on the photocathode layer 14 for a prescribed time. The array of cells 16 is biased by a d.c. voltage source 68 at a positive potential of approximately 1,000 volts relative to photocathode layer 14 during the exposure phase. The light intensity pattern received from object 64 causes the photocathode layer 14 to emit electrons 22. The electrons emitted from photocathode layer 14 have a spatial current variation corresponding to the incident light intensity pattern. The electrons 22 are accelerated by voltage source 68 and impinge on cells 16 in the array. As described hereinabove, the energetic electrons 22 cause emission of secondary electrons from the upper electrode 36 of each cell 16, causing the upper electrode 36 to become more positively charged. Each cell 16 becomes charged in proportion to the number of electrons 22 received from a portion of the photocathode layer 14 opposite that cell. A charge pattern is stored on the array of cells 16 which represents the light intensity pattern received from object 64. At the end of the exposure phase, the charge pattern is stored on the array of cells 16.

A readout phase subsequent to the exposure phase transfers the pattern stored on the array of cells 16 to a storage unit for later use so that the camera tube is available for another exposure. As illustrated in FIG. 5, in one embodiment, light from a light source 70 is directed at the rear surface of the camera tube opposite the side from which the light intensity pattern is received. The light from source 70 impinges on the first conductive layer 46 (FIG. 3) of each readout device 30, causing the production of photoelectrons in the conductive layer 46. A scanning circuit 72 is coupled to the row conductors 28 and to the column conductors 26 for sequentially addressing the readout devices 30 associated with each of the cells in the array. Scanning circuit 72 can address one cell at a time. Alternatively, the scanning circuit 72 can be configured to address the devices in one row or column simultaneously.

A d.c. voltage source 74 is coupled between the readout devices 30 and the readout electrodes 15 during the readout phase for biasing the readout electrodes 15 at a positive potential of about 20 volts relative to the readout devices 30. The addressed readout device, or devices 30, emit electron beams 60 which are accelerated across the evacuated cavity 12 and are collected by the readout electrodes 15. The electrons induce in one of the readout electrodes 15 a current which is provided to a sensing circuit 76.

Sensing circuit 76 typically includes an amplifier, a sample and hold circuit and an analog-to-digital converter for converting the sensed analog value to a digital representation. A digital value for each cell 16 is stored in a storage unit 78 such as a random access memory or a mass storage memory. The storage unit 78 stores values representing the charge pattern on the cells 16, which in turn represent the light intensity pattern from object 64. The stored values can subsequently be used to recreate an image of object 64 on a video display unit or to create a permanent image on film.

When an entire row or column of cells is addressed at once, a parallel sensing scheme or a scanning sensing scheme is utilized. When, for example, the conductors of the readout electrodes 15 are parallel to the column conductors 26, one row of cells at a time is addressed. The electron beam 60 from each readout device 30 in the addressed row is intercepted by the adjacent conductor of the readout electrode 15 to provide a parallel readout by row.

The light source 70 can illuminate the entire array of cells 16 as the readout devices are addressed or it can track the addressing. However, the light source 70 can provide a spot large enough to cover more than the addressed readout device 30. The addressing by scanning circuit 72 determines the scan pattern, rather than light from source 70.

In an alternate scanning technique, a selected row conductor 28 is biased negatively relative to all column conductors 26 so that all the readout devices 30 in the selected row are addressed electrically. Then, the selected row of readout devices 30 is scanned with a light beam from light source 70. Thus, the scanning is accomplished electrically by row and optically by column.

An energy level diagram of an addressed readout device 30 is shown in FIG. 6, and an energy level diagram of a nonaddressed readout device 30 is shown in FIG. 7. For FIGS. 6 and 7, the various layers of the device are indicated with the corresponding reference numerals from FIG. 3. Increasing potential is in the direction of arrow 80. For an addressed readout device 30, the corresponding column conductor 26 (conductive layer 48) is biased positively relative to the corresponding row conductor 28 (conductive layer 46) by about 4 volts, as shown in FIG. 6. Photoelectrons generated by light source 70 have an energy level 82 and have a known probability (depending on the design of readout device 30) of tunneling from conductive layer 46 through oxide layer 50 to conductive layer 48. The voltage on conductive layer 54 is determined by the charge on the corresponding cell 16. Thus, the barrier between conductive layer 48 and conductive layer 54 is determined by the charge on the associated cell 16. The barrier of oxide layer 56 decreases as the voltage on conductive layer 54 becomes more positive. A fraction of the electrons from conductive layer 48, depending on the barrier height, tunnels through the oxide layer 56 and reaches conductive layer 54.

The work function of the surface of conductive layer 54 is reduced by applying a cesium layer to its surface, thereby reducing the surface energy 84 below electron energy 82. Alternatively, about 5 to 10 angstroms of gold is deposited first, followed by a layer of cesium such that there is about one cesium atom for every two gold atoms. As a result, the electrons which tunnel through oxide layer 56 pass through conductive layer 54 and enter evacuated cavity 12 as electron beam 60. The purpose of applying a cesium layer or gold and cesium layers to the surface of conductive layer 54 is to lower the surface work function to avoid trapping of photoelectrons in conductive layer 54. Trapped electrons would drive conductive layer 54 more negative and tend to turn the readout device completely off.

For non addressed readout devices 30, as shown in FIG. 7, the row conductors 28 (conductive layers 46) are biased positively relative to the column conductors 26 (conductive layers 48) by about one volt. This bias condition prevents photoelectrons generated in first conductive layer 46 by light source 70 at energy level 82 as well as thermal electrons from tunneling through oxide layer 50 to conductive layer 48. As a result, the supply of electrons for tunneling through oxide layer 56 is cut off. The reverse bias for nonaddressed cells must be sufficiently large to prevent tunneling in half-addressed readout devices located in the same row and column as the addressed device.

Referring again to FIG. 6, the light from light source 70 which illuminates conductive layer 46 preferably has a wavelength such that the photons have about 0.8 to 0.9 of the work function energy of the metal. In the present example, the work function of aluminum is about 4 electron volts, and photons need about 3.2 electron volts. This corresponds to a wavelength of about 0.35 micrometers. The thickness of oxide layer 50 is selected to provide a probability of about 0.1 to 0.01 that a photoelectron will tunnel through to conductive layer 48. When conductive layer 54 is sufficiently positive, the photoelectrons are free electrons when they reach the oxide layer 56 and pass on through conductive layer 54 and are accelerated by voltage source 74 through the evacuated cavity 12 to the readout electrodes 15. When conductive layer 54 is sufficiently negative, the photoelectron has a reduced probability of getting through to conductive layer 54. This probability is reduced as conductive layer 54 becomes more negative. As a result, the potential of conductive layer 54 modulates the number of electrons injected into the evacuated cavity 12.

Thermal electrons can also tunnel from conductive layer 54 in the reverse direction to conductive layer 48, thereby causing conductive layer 54 to be gradually discharged. To prevent such discharge, it is necessary to make the probability of tunneling for low energy electrons quite small. There are approximately $10^{26}$ thermal electrons per second per square centimeter, which can potentially tunnel through to conductive layer 48. The readout of the array of cells 16 can be completed in about 0.01 second. The total capacitance per square centimeter of conductive layer 54 is on the order of $10^{-8}$ farad. In order to hold the voltage of the conductive layer 54 constant to within 0.1 volt during readout, the total charge transfer must be limited to about $10^9$ electrons in 0.01 seconds. The total intersection area of the readout devices is on the order of 0.01 square centimeter. Therefore, the current density must be less than $10^{13}$ electrons per second per square centimeter, and so the probability of thermal electron tunneling from conductive layer 54 to conductive layer 48 must be on the order of $10^{-13}$. Undesired tunneling of thermal electrons from conductive layer 46 to conductive layer 48 is not as severe a problem since these electrodes have an external applied voltage. However, the unwanted current must be low enough to limit overheating.

The wavelength of the light source 70 is selected to produce photoelectrons during readout of voltage 0.8 to 0.9 of the work function in order to give a tunneling probability of 0.1 to 0.01 for these photoelectrons while having a tunneling probability of less than $10^{-13}$ for thermal electrons.

After completion of a cycle including the exposure and the readout phase, it is necessary to charge all of the cells 16 to a relatively negative potential in preparation for a new exposure cycle. The photocathode layer 14 is flooded with light, and the array of cells 16 is biased at a relatively low positive voltage relative to photocathode layer 14. The resulting electrons from photocathode layer 14 have low energy so as to limit the production of secondary electrons. As a result, all of the cells 16 are driven to a negative potential relative to column conductors 26 and row conductors 28.

The lower electrode 40 of each cell 16 can be connected to conductive layer 48 of the associated readout device 30 in order to establish a bias voltage between upper electrode 36 and conductive layer 48. Alternatively, each lower electrode 40 can be connected to the conductive layer 48 of the readout device 30 in the adjacent row or column. When a pixel is addressed, the row or column conductor 28, 26 of the adjacent non addressed row or column can be controlled to thereby control the bias voltage on upper conductor 36. Varying this bias voltage has the effect of varying the brightness of the light pattern stored.

Figure 8:
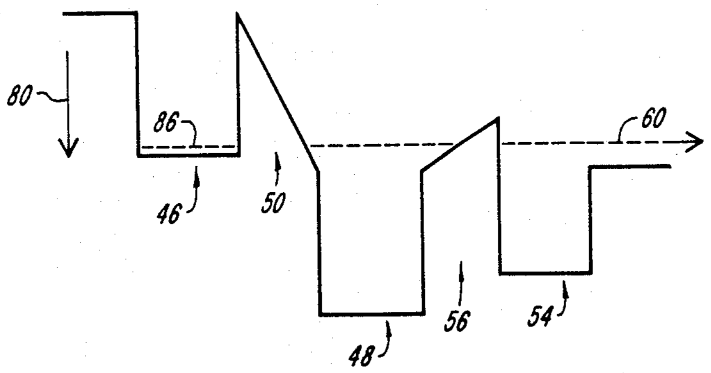
FIG. 8 is an energy diagram of a tunnel device which utilizes thermal electrons for readout and which has a lowered work function on the outer surface of the third electrode.

The energy diagram for an alternative readout method is illustrated in FIG. 8. An addressed readout device 30 is illustrated. Relatively low energy free electrons or thermal electrons are used during readout instead of photoenergized electrons from light source 70. In this embodiment, light source 70 can be eliminated. Free electrons or thermal electrons having a relatively low energy, as indicated at 86, have a probability of tunneling through oxide layer 50 to conductive layer 48. The electron current from conductive layer 46 through oxide layer 50 to conductive 48 is relatively independent of the voltage on conductive layer 54. However, the voltage on conductive layer 54 determines how much of the tunneling current passes through oxide layer 56 and conductive layer 54 into evacuated cavity 12 to readout electrodes 15 and how many electrons remain on conductive layer 48.

Only at the addressed readout device 30 is conductive layer 48 sufficiently positive relative to conductive layer 46 to permit appreciable current flow. For each addressed readout device 30, it is desirable to have $10^2$ to $10^4$ electrons flow for maximum photoexposure. Since the typical readout time internal is 0.01 seconds and the number of cells is on the order of $10^7$, the readout time for a single cell is typically $10^{-9}$ seconds. To provide $10^3$ electrons in $10^{-9}$ seconds requires a current flow of $10^{12}$ electrons per second. Since there are on the order of $10^{26}$ electrons per square centimeter per second reaching the barrier or $10^{18}$ electrons per second for a 1 micron square intersection, the probability of tunneling must be on the order of $10^{-6}$. This tunneling probability is established by adjusting the oxide thickness. For fine adjustment, the bias voltage between the conductive layers 46 and 48 is adjusted.

Figure 9:
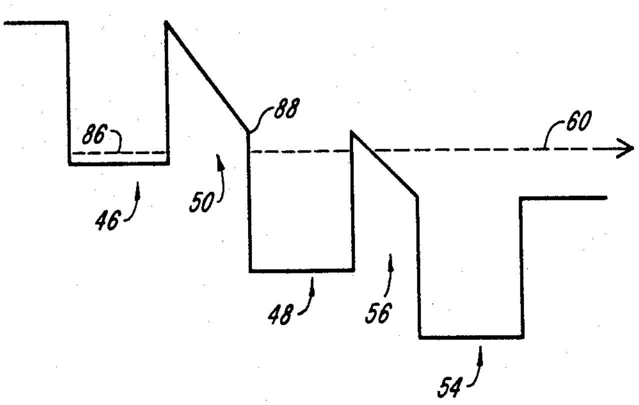
FIG. 9 is an energy diagram of a tunnel device which does not depend on lowering the work function on the outer surface of the third electrode.
Figure 11:
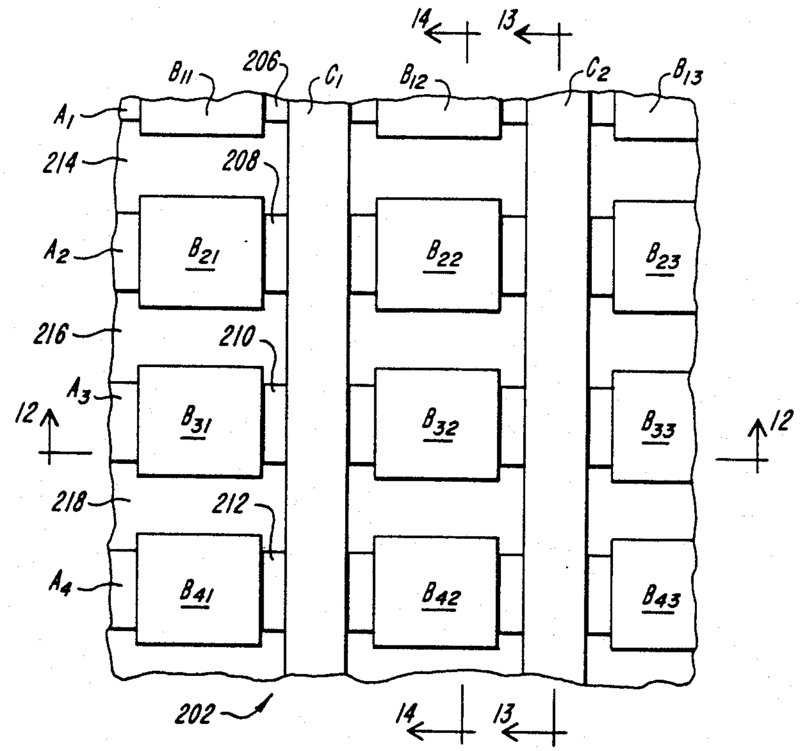
FIG. 11 is an enlarged, partial plan view of a cell array according to another preferred embodiment.

The energy diagram for another alternative readout technique is illustrated in FIG. 9. An addressed readout device 30 is illustrated. In this case, free electrons or thermal electrons having a relatively low energy 86 are utilized as described hereinabove. The conductive layer 48 is biased relative to conductive layer 46 such that the energy at point 88 on the surface of conductive layer 48 is slightly above the thermal electron energy 86. With this arrangement, it is not necessary to reduce the work function on the upper surface of conductive layer 54 in order to prevent collection of electrons by conductive layer 54. In this embodiment, conductive layer 48 is biased at a positive potential relative to conductive layer 46 of approximately 3.8 volts when addressed (about 0.2 volt less than the work function).

It will be understood that the readout device 30 based on tunneling principles can have more general applications than the camera tube shown and described herein. A single tunnel device 90 is shown in simplified form in FIG. 10. An envelope 92 encloses an evacuated cavity 94. The tunnel device 90 includes a first conductive layer 96 and a second conductive layer 98 separated by an oxide insulating layer 102. A third conductive layer 104, which serves as a control electrode, is separated from second conductive layer 98 by a second oxide insulating layer 106. The tunnel device 90 can be constructed in the same manner as described hereinabove in connection with readout device 30. The device 90 is enabled by the application of a positive voltage to conductive layer 98 relative to conductive layer 96, and an input light beam 110 produces photoelectrons in conductive layer 96. The photoelectrons have a probability of tunneling through oxide layers 102 and 106 as described hereinabove in connection with readout device 30. The tunneling current through oxide layer 106 is modulated by the voltage on conductive layer 104. An output electron beam 112 passes through evacuated cavity 94 to an output electrode 114 and produces an output signal 120. The device 90 is biased off by a negative potential on conductive layer 98 relative to conductive layer 96.

The alternative readout techniques described above in connection with readout devices 30 can be applied to the tunnel device 90. Thus, the light beam 110 for readout can be eliminated and the device 90 can be constructed to provide tunneling of thermal electrons from conductive layer 96 through oxide layer 102 to conductive layer 98. The thermal electron current then tunnels through oxide layer 106 to conductive layer 104 as a function of the control voltage applied to conductive layer 14 and passes through conductive layer 104 to become electron beam 112.

For either photoelectron or thermal electron readout, the electrons which do not tunnel through oxide layer 106 remain in conductive layer 98. The electrons in conductive layer 98 can be sensed as an alternative or an additional output signal 122 from the device 90. The output signal 122 is sensed by means of a conductor connected to conductive layer 98 whereas output signal 120 is sensed by means of electron beam 112 and output electrode 114. The output signal 122 is effectively the inverse of output signal 120 since those electrons which do not tunnel through oxide layer 106 to become electron beam 112 remain in conductive layer 98 and become output signal 122. Thus, when the control voltage on conductive layer 104 causes the potential barrier to be relatively high, few electrons tunnel through oxide layer 106. This causes output signal 120 to be relatively small and output signal 122 to be relatively large. Conversely, when the potential barrier is relatively low, more electrons tunnel through oxide layer 106, thereby causing output signal 120 to be relatively large and output signal 122 to be relatively small.

An alternate, preferred embodiment of the present invention is now described with reference to FIGS. 11–26. A camera tube is constructed generally as shown in FIG. 1 and described hereinabove. The cells 16 shown in FIG. 1 are replaced by a cell array of the type shown in FIGS. 11–14 and described hereinafter. Electrons 22 from the photocathode layer 14 are accelerated across the evacuated cavity 12 by a positive voltage in the range of 1,000 to 10,000 volts.

A cell array 202 in accordance with the invention will now be described with reference to FIGS. 11–14. The cell array 202 includes a plurality of storage electrodes, $B_{11}$, $B_{12}$, $B_{13}$, $B_{21}$, etc. arranged in a planar array of rows and columns to form a grid structure. A typical array may have 4,000 B electrodes in each row and 4,000 columns. The B electrodes can be considered pixels which collectively store the image of a light pattern as described hereinafter. The B electrodes are formed on the upper surface of a substrate 204 which is typically glass. In a preferred embodiment, the B electrodes each comprise a thin metal layer such as aluminum having a thickness on the order of 0.1 micrometer to 0.5 micrometer and are typically square or rectangular in shape, having dimensions of one to a few micrometers on a side. The B electrodes are spaced apart and electrically isolated from each other.

Between adjacent columns of B electrodes are electrodes $C_1$, $C_2$, etc. which act as column conductors in the cell array. Preferably, the C electrodes are also located on the top surface of substrate 204, are parallel to each other, and are coplanar with the B electrodes. The C electrodes can be a metal such as aluminum.

Figure 13:
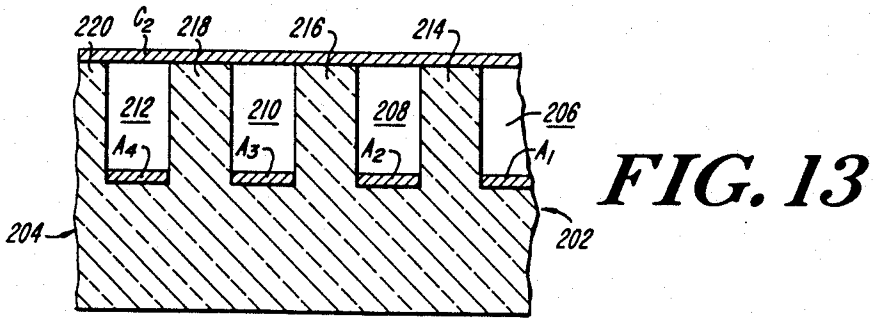
FIG. 13 is an enlarged, partial, cross-sectional view of the cell array of FIG. 11 taken along the line 13—13.
Figure 14:
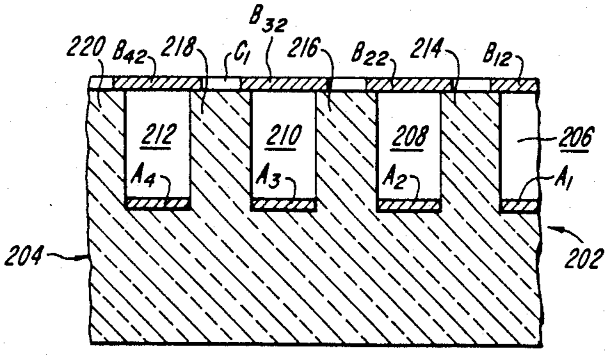
FIG. 14 is an enlarged, partial, cross-sectional view of the cell array of FIG. 11 taken along the line 14—14.

The substrate 204 is provided with channels 206, 208, 210, 212 beneath each row of B electrodes, as best shown in FIG. 14. The channels 206, 208, 210, 212 define between them ridges 214, 216, 218, 220. The B electrodes span the channels and are supported by the adjacent ridges. For example, with reference to FIG. 14, electrode $B_{22}$ is supported by ridges 214 and 216 and spans channel 208. The electrode $B_{32}$ is supported by ridges 216 and 218 and spans channel 210, etc. As shown in FIG. 13, the C electrodes span the channels 206, 208, 210, 212 and are supported by each of the ridges 214, 216, 218, 220. The channels 206, 208, 210, 212, typically have a depth on the order of one to a few micrometers and a width suitable for support of the B electrodes.

Positioned at the bottom of each channel 206, 208, 210, 212 are electrodes $A_1$, $A_2$, $A_3$, $A_4$. The A electrodes are formed of a thin metal layer such as aluminum and run the length of respective channels to form row conductors in the cell array. As described above, the cell array 202 is located within evacuated envelope 10. Thus, the channels 206, 208, 210, 212 are evacuated, and the A electrodes are spaced from the B electrodes and the C electrodes by vacuum regions. The crossover of each A electrode ($A_n$) and each C electrode ($C_n$) defines a cell $A_n$ $C_n$, which is addressable as described hereinafter.

Figure 12:
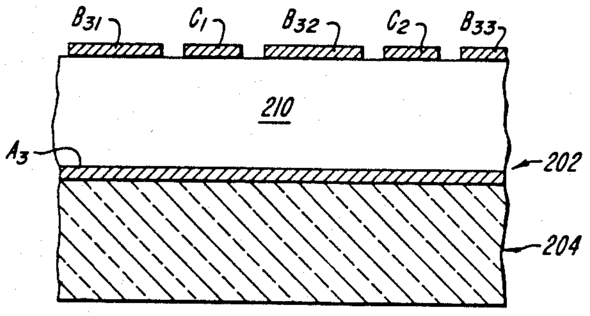
FIG. 12 is an enlarged, partial, cross-sectional view of the cell array of FIG. 11 taken along the line 12—12.
Figure 15:
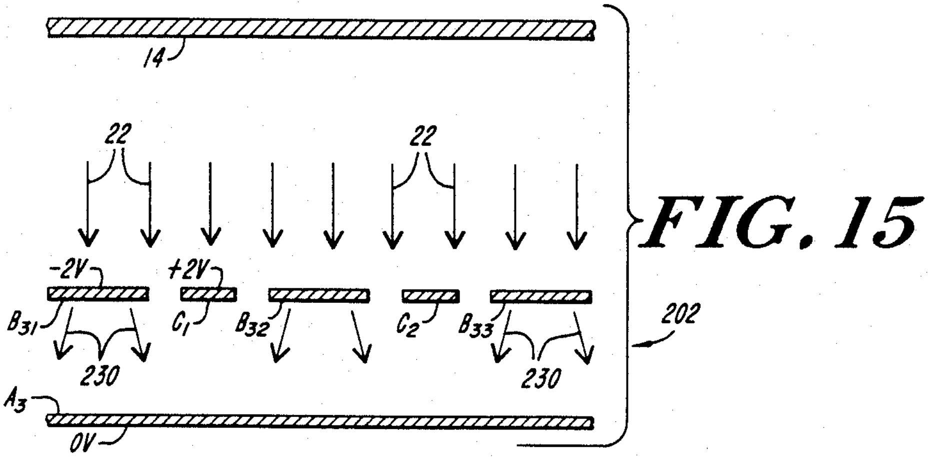
FIG. 15 is an enlarged, partial, cross-sectional schematic diagram of the cell array during the exposure phase.

The operation of the camera tube employing cell array 202 will now be described with reference to FIGS. 15–21 which schematically illustrate several cells in the array as viewed in the same direction as FIG. 12, with the substrate 204 omitted for simplicity. The exposure phase is illustrated in FIG. 15. During exposure, an image of an object 64 (FIG. 4) is focused by a lens system 66 on the photocathode layer 14 for a prescribed time. The array of cells 202 is biased by a DC voltage source 68 at a positive potential of 1,000 to 10,000 volts relative to photocathode layer 14 during the exposure phase. The light intensity pattern from object 64 causes the photocathode layer 14 to emit electrons 22 from its rear surface. The electrons have a spatial current variation corresponding to the incident light intensity pattern. The electrons 22 are accelerated by voltage source 68 and impinge on the cell array 202 as shown in FIG. 15.

Prior to exposure, the B electrodes are biased at a negative voltage relative to the A electrodes. In an example, the B electrodes are biased at about −2 volts relative to the A electrodes, and the A electrodes are biased at 0 volts. When the electrons 22 impinge on electrodes $B_{31}$, $B_{32}$, $B_{33}$, secondary electrons 230 are emitted by the B electrodes causing them to become more positive in potential. Since the A electrodes are positively biased relative to the B electrodes, they collect the secondary electrons 230 emitted by the B electrodes. The increase in potential on each of the B electrodes is responsive to the electron current received from the photocathode layer 14 and thereby represents the light intensity received from the object being photographed. Collectively, the potentials on the B electrodes after exposure represent the light intensity pattern that was received from the object 64. For the present example, it is assumed that the normal range of voltages for the B electrodes is between −2 volts and −1 volt. Thus, a relatively high light intensity increases the potential on the B electrode from −2 volts to −1 volt relative to the A electrodes. It will be understood that the bias voltages on the electrodes are arbitrary and that other values can be used, provided that the A electrodes are positive relative to the B electrodes during exposure. The voltage on the C electrodes during the exposure phase is not critical, except that the C electrode voltages can't be so negative that secondary electrons are prevented from leaving the B electrodes.

During the exposure phase, the B electrodes must be at a negative potential relative to the C and/or A electrodes so that the net flow of electrons is away from the B electrodes. This can be accomplished by increasing the voltage between each A electrode and the photocathode layer 14 (to 200 volts, for example), by decreasing the voltage between each A electrode and each C electrode (to 1 volt, for example) or by making each C electrode positive relative to each A electrode. The B electrodes lose secondary electrons as a result of energetic primary electrons 22 supplied from photocathode layer 14. Therefore, the B electrodes are left with a net positive charge relative to the initial charge before the exposure phase.

After the exposure phase, a charge pattern is stored in the cell array on the B electrodes. The charge pattern represents the light intensity pattern applied to the camera tube during the exposure phase. Following the exposure phase, ea readout phase is utilized to convert the charge pattern stored on the B electrodes to a series of electronic signals representing the charge pattern.

After completion of the exposure phase, the high voltage between the photocathode 14 and the cell array is preferably removed. The technique for reading out the charge pattern utilizes a structure in each cell somewhat analogous to a triode vacuum tube. Electron emission from each A electrode is stimulated by application of ultraviolet radiation. Each C electrode is biased to collect the electrons emitted by the associated A electrode. The electrons flowing between the A and C electrodes of each cell define a readout current for that cell. The electrode voltages are adjusted to prevent collection of the readout current by the B electrodes. However, in a manner similar to a triode, the charge on the B electrodes adjacent to the C electrode influences the magnitude of the readout current that reaches the C electrode. As noted above, the space between the A and C electrodes is a vacuum. In an alternative readout technique, the C electrodes are biased to prevent collection of the readout current from the A electrodes, and the readout signal is obtained from readout electrodes positioned on the opposite side of the evacuated envelope 10 adjacent to the photocathode layer 14.

Regardless of the readout technique used, the B electrodes are electrically isolated from the electrodes that emit and collect the electrons that constitute the readout current. However, the charge on the 8 electrodes influences the flow of electrons through the evacuated space between those electrodes. An advantage of this configuration is that a relatively small change in charge on the B electrodes produces a relatively large change in readout current. This amplification is similar to the amplification produced in a triode.

The voltages on the B electrodes, which form the light pattern sensing elements of the array, are determined by their charge and by capacitive coupling between the B electrodes and the C electrodes, between the B electrodes and the A electrodes, and between the B electrodes and the photocathode layer 14. Charging level and capacitive coupling establish the B electrode voltages because the B electrodes are electrically isolated from all other conductors in the camera tube.

Since the B electrodes are electrically isolated, their voltage cannot be directly controlled. Instead, the B electrode voltages must be controlled by controlling the voltages on the electrodes that are not electrically isolated (the A electrodes, C electrodes and the photocathode layer 14) and by altering the charge on the B electrodes by causing a flow of primary electrons to, or a flow of secondary electrons away from the B electrodes.

The overall brightness or darkness of the image sensed by the camera tube can be varied by controlling the voltage on the photocathode layer 14 during readout. Since the photocathode layer 14 is capacitively coupled to the B electrode a change in voltage on the photocathode layer 14 produces a change in voltage of all the B electrodes relative to the A and C electrodes. Therefore, the effective brightness level of the light intensity pattern is varied. Such brightness control is useful to compensate for varying ambient light conditions. The control can be manual or automatic.

During the readout phase, the B electrodes should be at a negative potential relative to a source of electrons. If the B electrodes were positive relative to the electron source, they would collect electrons instead of controlling the flow of electrons. In addition, the B electrodes are more or less negative, depending on the amount of light received during the exposure phase. During the exposure phase, the B electrodes can emit electrons as described above and become more positive. Alternatively, the B electrodes can collect electrons from the C electrodes or from some other source during exposure and become more negative.

In the readout phase, if electrons are generated by the A electrodes and collected by the C electrodes, then the C electrodes must be positive (by one or two volts, for example) relative to the A electrodes. The voltages on the B electrodes can be adjusted by making the photocathode layer 14 more negative or more positive relative to the A electrodes. The B electrodes are made sufficiently negative to reduce the flow of electrons from the A electrodes to the C electrode when the B electrode has received no light during exposure. If the B electrode has received light and has become more positive, then the B electrode allows electrons to flow between the A and C electrodes. The proper bias for the photocathode layer 14 relative to the A electrodes during readout is most easily determined experimentally. The bias is adjusted so that the image read out has an acceptable brightness level. The voltage applied to photocathode layer 14 during readout can be controlled manually or automatically by a light sensor meter, depending on the ambient light conditions.

Since the cell array comprises a large number of B electrodes, it is necessary to perform readout sequentially, either one cell at a time or one column of cells at a time. The sequential readout is performed by addressing an individual cell or a column of cells for readout and maintaining the non addressed cells in the array in a disabled condition that does not interfere with readout from the addressed cell or cells.

Figure 16A:
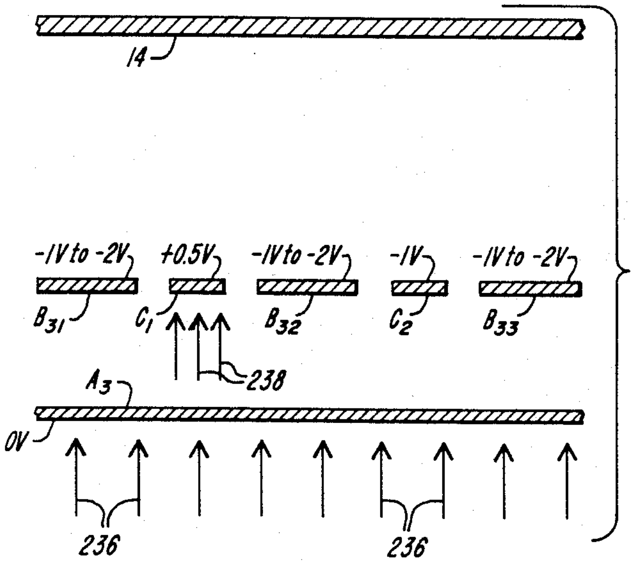
FIGS. 16A and 16B are enlarged, partial, cross-sectional schematic diagrams of the cell array illustrating readout with an ultraviolet radiation source illuminating the entire cell array.
Figure 16B:
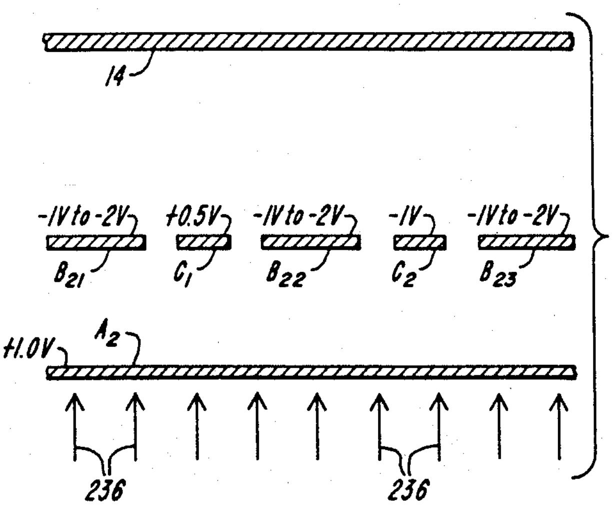

In accordance with one preferred readout technique, each A electrode is illuminated on its back surface with ultraviolet radiation which causes emission of photoelectrons. In FIGS. 16A and 16B, ultraviolet radiation 236 illuminates, or floods, the entire cell array from a direction that is opposite to the direction that the charge intensity pattern was received. The ultraviolet radiation 236 illuminates each A electrode, causing emission of photoelectrons. Ultraviolet radiation is selected because it provides the energy required (approximately 4 electron volts) to liberate photoelectrons from aluminum. Since the ultraviolet radiation 236 is applied to the rear surfaces of the A electrodes through substrate 204, substrate 204 must be an ultraviolet transmissive glass such as K-5 available from Schott. In the case of flood illumination of the entire cell array with ultraviolet radiation 236, a cell or cells must be selected electrically for readout.

The selection or addressing is performed by applying suitable bias voltages to the C electrodes and to the A electrodes. As noted above, the B electrodes after exposure have a potential in the range of −1 volt to −2 volts relative to electrodes, depending on the incident light intensity. In FIG. 16A, the cell $A_3C_1$ defined by the crossover of electrode $C_1$ and electrode $A_3$ is addressed for readout. The electrode $A_3$ is held at 0 volts, and the electrode $C_1$ is biased at +0.5 volt relative to electrode $A_3$, which is more positive than the most positive potential expected on the B electrode. The ultraviolet radiation 236 causes emission of photoelectrons from electrode $A_3$. Since electrode $C_1$ is more positive than electrode $A_3$, the liberated photoelectrons are attracted toward electrode $C_1$ to form a readout current 238.

Since the adjacent electrodes $B_{31}$ and $B_{32}$ are more negative in potential than electrode $A_3$, the readout current 238 is not drawn to the B electrodes. However, the charge on the adjacent electrodes $B_{31}$ and $B_{32}$ produces electric fields which influence readout current 238. Accordingly, the magnitude of the current 238 that reaches electrode $C_1$ is a function of the charge on the adjacent electrodes $B_{31}$ and $B_{32}$. More negative potentials on the B electrodes, which correspond to a lower incident light intensity pattern, tend to reduce the readout current. As the potentials on the B electrodes increase due to a higher incident light intensity, the readout current 238 increases. The readout current 238 is collected by electrode $C_1$ and becomes a readout signal representative of the charges on electrodes $B_{31}$ and $B_{32}$.

With reference to FIG. 16A, the cell $A_3C_2$ defined by the crossover of electrode $C_2$ and electrode $A_3$ is biased off by application to electrode $C_2$ of a bias voltage of −1 volt relative to electrode $A_3$. Photoelectrons emitted from electrode $A_3$ are not drawn toward electrode $C_2$. Nonaddressed cells are further illustrated in FIG. 16B. Nonaddressed electrode $A_2$ is biased at +1.0 volt relative to electrode $A_3$ and is therefore more positive than addressed electrode $C_1$ (+0.5 volt) and nonaddressed electrode $C_2$ (−1 volt). As a result, photoelectrons emitted by electrode $A_2$ are not drawn toward any of the C electrodes. Thus, FIGS. 16A and 16B illustrate the possible conditions: (1) cell $A_3C_1$ is fully addressed for readout, (2) cells $A_3C_2$ and $A_2C_1$ are half-addressed and provide no readout, and (3) cell $A_2C_2$ is fully nonaddressed and provides no readout.

According to another preferred readout technique, the flood ultraviolet radiation is replaced with an ultraviolet line beam which illuminates only one A electrode at a time. The line beam has cross-sectional dimensions approximately equal to the dimensions of one A electrode and is scanned so as to sequentially illuminate each of the A electrodes in the cell array. The readout of the cells associated with each A electrode can be either serial or parallel. For serial readout, a single cell is electrically addressed, as illustrated in FIG. 16A. The line beam remains on each A electrode for a sufficient time to sequentially address each cell in the illuminated row. For parallel readout, each C electrode is electrically addressed and, when each A electrode is illuminated by the line beam, the corresponding readout signals appear in parallel on the C electrodes. The parallel readout signals can be temporarily stored in a plurality of storage elements for subsequent processing. The parallel readout technique is faster than the serial technique, since all cells in a row are read out simultaneously.

Figure 17:
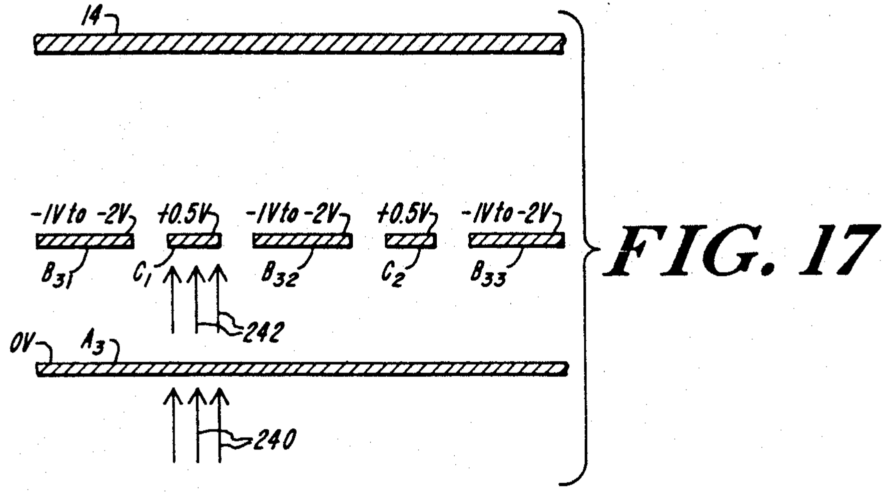
FIG. 17 is an enlarged, partial, cross-sectional schematic diagram of the cell array illustrating readout with a scanning ultraviolet spot beam.

According to yet another readout technique, the cell array is illuminated with ultraviolet radiation that is focused into a spot beam having dimensions commensurate with the dimensions of a single cell. As shown in FIG. 17, an ultraviolet spot beam 240 illuminates a portion of electrode $A_3$ in the region of cell $A_3C_1$. Thus, photoelectrons are emitted only in cell $A_3C_1$ to form readout current 242. When spot beam 240 is utilized for readout, photoelectron emission is stimulated only in the illuminated cell and all remaining cells in the array have no readout current. Since addressing is accomplished optically, it is only necessary that the illuminated cell be electrically biased for collection of the current 242. Non addressed cells can be biased in any convenient manner, since no photoelectrons are emitted in these cells. Preferably, all cells in the array are simultaneously biased for readout with the same bias voltages as cell $A_3C_1$. All C electrodes are biased at a positive potential relative to the A electrodes, and both the C and A electrodes are biased at a positive potential relative to the most positive expected potential on the B electrodes. In order to provide a complete readout of the cell array charge pattern, spot beam 240 is sequentially scanned over all the cells in the array. Usually, scanning is performed row by row or column by column.

Figure 18A:
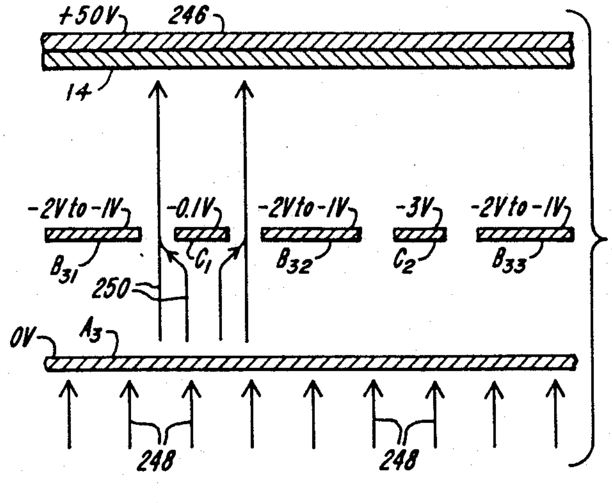
FIGS. 18A and 18B are enlarged, partial, cross-sectional schematic diagrams of the cell array illustrating readout from a readout electrode on the photocathode.

In accordance with another preferred readout technique, the readout current is collected by one or more electrodes located on the opposite side of the evacuated cavity 12 (FIG. 1) from the cell array 202. As shown in FIG. 18A, a readout electrode 246 is spaced from the B electrodes and the C electrodes by about 50 micrometers. Typically, the readout electrode 246 is located between the photocathode layer 14 and the transparent envelope 10. The readout electrode 246 can be formed as parallel strips or as a continuous layer. When a continuous layer is utilized, it must be sufficiently thin to transmit light from the object being photographed to photocathode layer 14. In addition, photocathode layer 14 must be sufficiently thin to transmit the readout current to readout electrode 246.

In the embodiment of FIG. 18A, the entire cell array is flooded with ultraviolet radiation 248 thereby requiring that a single cell be electrically addressed by appropriate biasing of the C electrodes and the A electrodes. The cell $A_3C_1$ is addressed by applying to electrode $C_1$ a voltage of −0.1 volt relative to electrode $A_3$. As in the previous examples, the B electrodes after exposure are at a voltage relative to electrode $A_3$ in the range of −2 volts to −1 volt depending on the incident light intensity. This is the desired voltage after the accelerating voltage is applied between the readout electrode 246 and electrode $A_3$. Therefore, the voltage of the B electrodes relative to electrode $A_3$ before the accelerating voltage is applied must be more negative than the desired final voltage by the amount that the B electrodes float up when the accelerating voltage is applied. In response to the ultraviolet radiation 248, electrode $A_3$ emits photoelectrons which form a readout current 250. The readout electrode 246 is biased at a relatively high positive accelerating voltage (typically 50 volts) relative to the A electrodes. Since electrode $C_1$ is more negative than electrode $A_3$, the readout current 250 is not collected by electrode $C_1$. Readout current 250 passes between electrode $C_1$ and adjacent electrodes $B_{31}$ and $B_{32}$ and is drawn to readout electrode 246. The readout current 250 reaching readout electrode 246 is influenced by and is a function of the charge on adjacent B electrodes $B_{31}$ and $B_{32}$.

Electrode $C_2$ is biased at a potential of $-3$ volts so that readout current in nonaddressed cell $A_3$ $C_2$ is suppressed and does not reach readout electrode 246. Nonaddresed cells are further illustrated in FIG. 18B. Electrode $A_2$ is non addressed by applying a voltage of $+2$ volts. Thus, addressed electrode $C_1$ and nonaddressed electrode $C_2$ both are at a substantially negative potential relative to electrode $A_2$, and readout currents are suppressed by these electrodes.

Figure 18B:
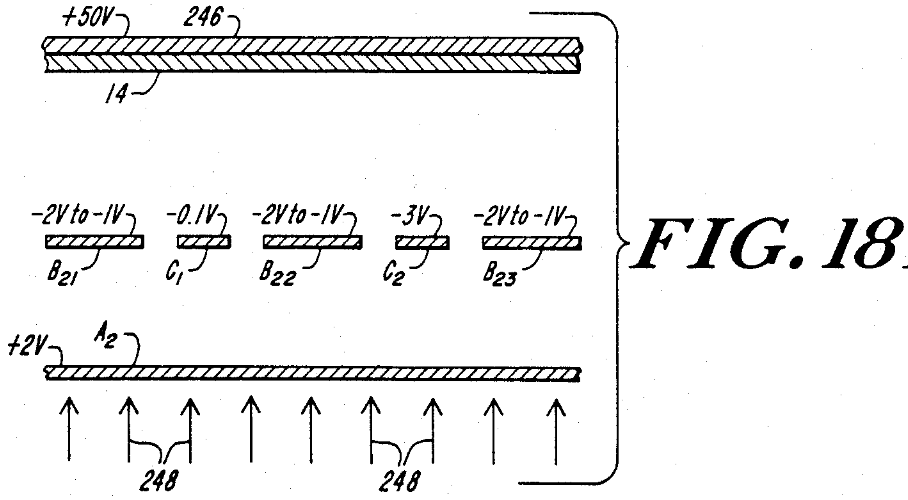

In summary, the following addressing conditions are illustrated in FIGS. 18A and 18B:

1. Cell $A_3C_1$ is fully addressed so that the readout current 250 reaches electrode 246 and is a function of the voltage on adjacent electrodes $B_{31}$ and $B_{32}$.
2. Cells $A_3C_2$ and $A_2C_1$ are half-addressed and the respective readout currents are suppressed.
3. Cell $A_2C_2$ is fully nonaddressed and readout current is suppressed.

The configuration shown in FIGS. 18A and 18B has been described with reference to ultraviolet radiation 248 that floods the entire cell array. It will be understood that an ultraviolet line beam can be utilized for illumination of one full A electrode at a time. In this case, the line beam is sequentially scanned over each A electrode, and the cells associated with each illuminated A electrode are sequentially addressed. This condition is illustrated in FIG. 18A wherein electrode $A_3$ is assumed to be illuminated by an ultraviolet line beam. Electrode $C_1$ is biased to permit readout current 250 to reach readout electrode 246, and the remaining C electrodes are biased to suppress readout currents. The cells along electrode $A_3$ are sequentially addressed. Then the ultraviolet line beam is moved to the next A electrode in the array and the sequential scanning of C electrodes is repeated. For either flood illumination or line beam illumination, the readout current received by readout electrode 246 is a sequential representation of the charge pattern stored in the cell array. Parallel readout cannot be used in the configuration of FIG. 18A, since only a single readout electrode 246 is provided.

Figure 19:
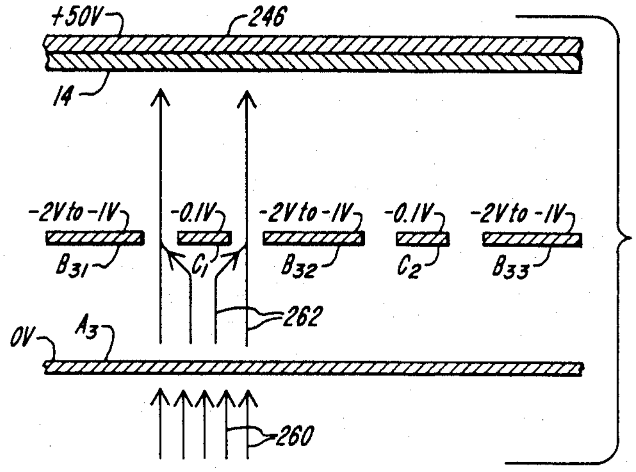
FIG. 19 is an enlarged, partial, cross-sectional schematic diagram of the cell array illustrating readout from a readout electrode on the photocathode using a scanning ultraviolet spot beam.

The readout electrode 246 can be utilized in conjunction with a scanned ultraviolet spot beam, as illustrated in FIG. 19. An ultraviolet spot beam 260 illuminates cell $A_3$ $C_1$ and the remaining cells in the array are not illuminated. Photoelectrons are emitted by electrode $A_3$ only in cell $A_3$ $C_1$ to form a readout current 262, and photoelectrons are not emitted over the remainder of the array. Accordingly, it is necessary only that cell $A_3$ $C_1$ be electrically biased for readout. Electrode $C_1$ is biased at a negative potential of $-0.1$ volt relative to electrode $A_3$ so that the readout current 262 is not collected by electrode $C_1$. The readout current 262 passes between the electrode $C_1$ and the adjacent electrodes $B_{31}$ and $B_{32}$ and is drawn to readout electrode 246 by the positive potential applied to it. The magnitude of the readout current 262 reaching electrode 246 is a function of the charge on adjacent electrodes $B_{31}$ and $B_{32}$. Since no readout current is stimulated in the remaining cells, these cells may be biased in any convenient manner. Preferably, all the cells in the array can be biased for readout in the same manner as cell $A_3$ $C_1$ so that switching of bias voltages is not necessary. The cell addressing is performed optically by scanning of the ultraviolet spot beam 260.

Figure 20:
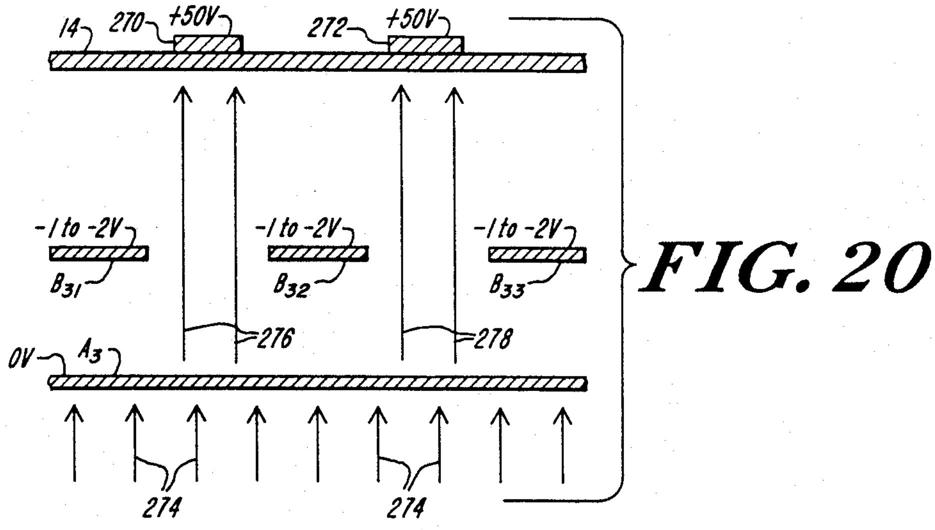
FIG. 20 is an enlarged, partial, cross-sectional diagram of the cell array illustrating readout from strip readout electrodes on the photocathode using an ultraviolet line beam.

A further variation of the above readout technique is illustrated in FIG. 20. Readout electrodes 270, 272, etc. are formed as a series of parallel conductive strips located on photocathode 14. The readout electrodes 270, 272 etc. are perpendicular to the A electrodes and are aligned parallel to the rows of B electrodes. This configuration can be utilized either with an ultraviolet spot beam or an ultraviolet line beam. When a spot beam is utilized, only one cell at a time is illuminated, and a readout current is generated only in that cell. The readout current reaches the adjacent readout electrode 270, 272 etc. When an ultraviolet line beam 274 is utilized as illustrated in FIG. 20, readout currents 276, 278 etc. are stimulated at each cell along the illuminated A electrode. The individual readout currents 276, 278 etc. are collected by the respective readout electrodes 270, 272 etc. in parallel, and the parallel readout signals are temporarily stored for later processing. The ultraviolet line beam 274 is then scanned to the next A electrode in the array and the process is repeated.

Figure 21:
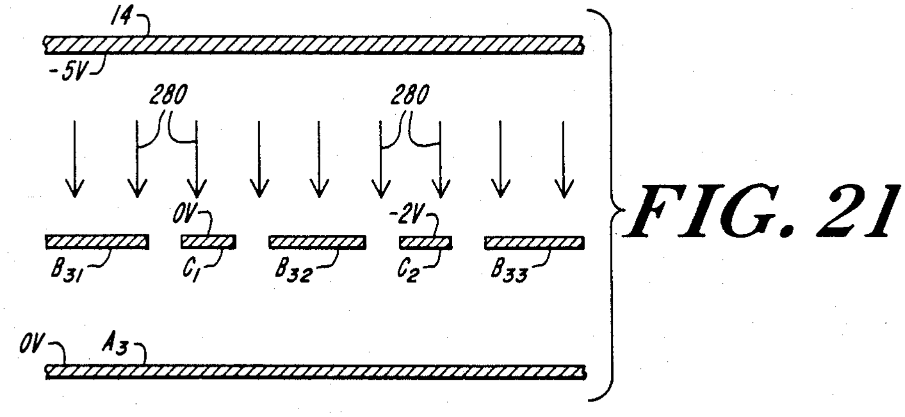
FIG. 21 is an enlarged, partial, cross-sectional schematic diagram of the cell array illustrating the reset phase.

After the readout phase has been completed, the B electrodes must be discharged or reset to a prescribed initial voltage in preparation for another exposure. One reset technique is illustrated in FIG. 21. The array is flooded with a uniform, relatively high intensity light beam causing the photocathode layer 14 to emit a uniform current 280 that floods all the B electrodes and causes a negative charge to build up on them. The voltage of the photocathode layer 14 is 5 volts negative relative to A and C electrodes, so that secondary electron emission is minimized. When the B electrodes reach about $-2$ volts, further negative charging does not occur because the electrons from the photocathode layer 14 go to the C electrodes. At this point, the entire array is at a uniform small negative voltage. Then, the current 280 is terminated, and the A and C electrodes are switched to the required voltages for the exposure phase.

An alternative reset technique will now be described. If there is no substantial flow of electrons to or from the B electrodes during the readout phase and there is a flow of secondary electrons away from the B electrodes during the exposure phase, then there must be flow of electrons to the B electrodes during the reset phase. During the reset phase, a flood of primary electrons is generated by illuminating the photocathode layer 14, and the flow of electrons is accelerated across the tube to the B electrodes. To accelerate the electrons, photocathode layer 14 must be negative, typically at about 100 volts, relative to the B and C electrodes. All that is available for control are the C and A electrodes. When the B electrodes have no charge, each B electrode is at a voltage determined by (1) the voltage on the adjacent A electrode and the photocathode layer 14 and (2) the spacings between each of the electrodes. Thus, if the A electrodes are spaced from the photocathode layer 14 by 100 micrometers, the B electrodes are spaced from the A electrodes by one micrometer, and 100 volts is applied between the A electrodes and the photocathode layer 14, then the voltage on the B electrodes is approximately one volt less than the voltage on the A electrodes. The C electrodes have a lesser effect on the B electrode voltage, since the capacitive coupling is smaller.

Now, assume that the voltage on the C electrodes is two volts more negative than the voltage on the A electrodes. If the B electrode voltage is more positive than the C electrode voltage because it acquired a net charge during the previous exposure phase, then under a flood of primary electrons from the photocathode layer 14, secondary electrons emitted by the B electrodes cannot flow to the A electrodes or the C electrodes. Secondary electrons emitted by the C electrodes can flow to both the A and B electrodes. There is a net flow of electrons to the B electrodes, and B will come to an equilibrium voltage such that the flow of electrons from the C electrodes to the B electrodes balances the flow of electrons from the B electrodes to the A electrodes. Thus, the B electrodes assume a voltage between that of the C and A electrodes. A more negative C electrode voltage produces a more negative final net charge on the B electrodes. Typically, the C electrode voltage is about 5 volts more negative than the A electrode voltage during the reset phase.

Figure 22:
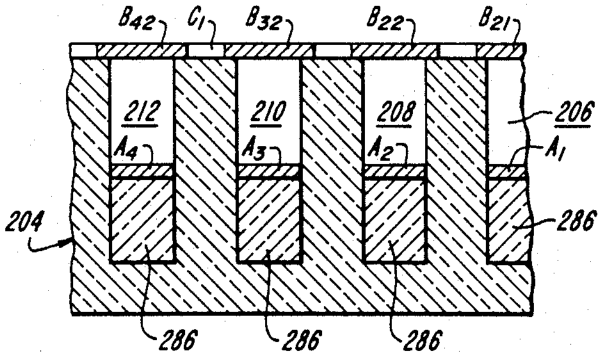
FIG. 22 is an enlarged, partial, cross-sectional diagram of the cell array illustrating use of light channels for carrying ultraviolet radiation to the A electrodes.

A variation of the array structure that is advantageous in performing ultraviolet line beam scanning during readout is illustrated in FIG. 22. A partial cross-sectional view corresponding to FIG. 14 illustrates the electrodes $B_{42}$, $B_{32}$, $B_{22}$, $B_{21}$ and the electrodes $A_4$, $A_3$, $A_2$, $A_1$. Light channels 286 are disposed under each of the A electrodes in the substrate 204. The light channels 286 run parallel to the A electrodes and have a higher index of refraction than the surrounding substrate 204. As a result, ultraviolet radiation for illuminating each A electrode can be supplied through the end of the respective light channel 286. A suitable glass for light channels 286 is type UBK-7 available from Schott. The ultraviolet radiation is guided along the light channel 286 and is gradually coupled through the upper surface thereof to the respective A electrode. Line beam scanning can be accomplished by sequential illumination of the ends of the light channels 286, and the requirement for accurate formation of a line beam eliminated.

Figure 23:
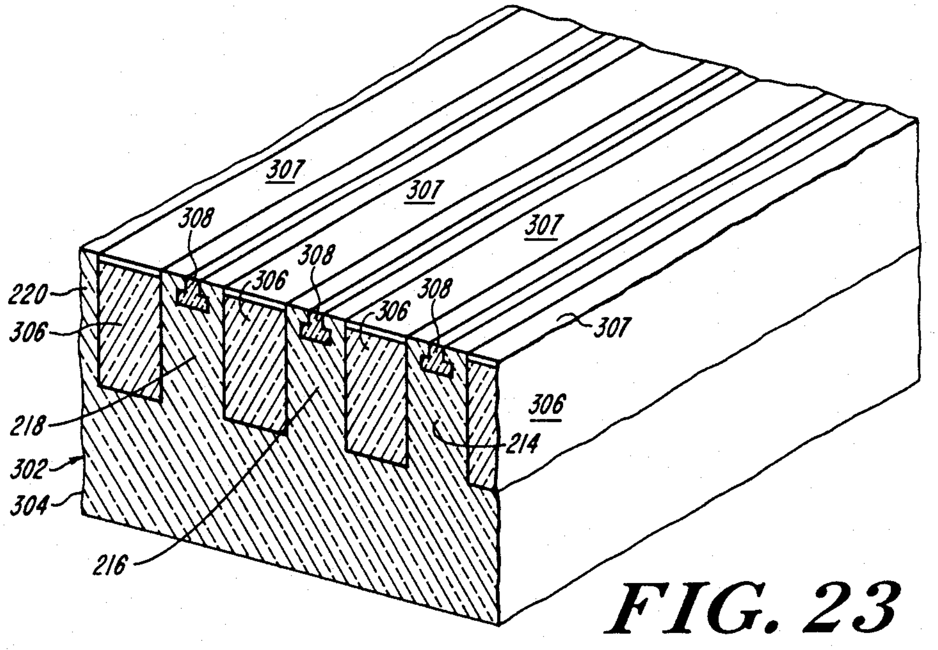
FIGS. 23–26 illustrate a process for fabricating the cell array.

A method for fabricating the cell array 202 is now described with reference to FIGS. 23–26. As shown in FIG. 23, a starting substrate 302 is formed of glass, typically having a thickness on the order of one millimeter. A bulk region 304 of the substrate 302 is formed of nonetchable material. Elongated, parallel, spaced-apart strips 306 of an etchable material are disposed in the upper portion of the substrate 302. The parallel strips 306 correspond to the channels 206, 208, 210, 212 shown in FIGS. 11–14 and described hereinabove. The parallel strips 306 typically have a depth on the order of two micrometers and a width on the order of three micrometers and define between them ridges 214, 216, 218, 220 in the nonetchable portion of bulk region 304. The parallel strips 306 are typically square or rectangular in cross-section. A thin layer 307 of nonetchable material covers each of the strips 306. The layers 307 typically have a thickness of about 0.5 micrometer.

Formed in the upper portion of ridges 214, 216, 218, 220 are parallel strips 308 of etchable material. The strips 308 are parallel to each other and parallel to the strips 306. The strips 308 can have any convenient dimension as long as they are contained within respective ridges 214, 216, 218, 220. The cross-sectional shape of strips 308 are wider at the bottom than at the top surface of substrate 302. The cross-sectional shape can be stepped to wider at the bottom as shown in FIG. 23 or tapered to wider at the bottom (not shown). The purpose of this shape is to provide an undercut region that breaks the continuity of a deposited metal layer a described hereinafter.

The nonetchable bulk region 304 and the layers 307 are preferably $SiO_2$ containing no more than 5% $B_2O_3$ and no more than 15% of other oxides. One example of such a nonetchable glass is type K-5 available from Schott. The etchable parallel strips 306 and the etchable parallel strips 308 are preferably $SiO_2$ containing in excess of 20% $B_2O_3$. One example of such an etchable glass is type LAK-3 available from Schott.

Since the cross-section of the substrate 302 is uniform in one direction, (the long dimension of parallel strips 306 and 308), the substrate 302 is preferably formed by glass drawing of a substrate blank having much larger dimensions than the final substrate 302. The substrate blank is formed from individual components corresponding individually to a bottom bulk region, etchable strips 306 and ridges 214, 216, 218 and 220. The components are assembled together in the desired configuration shown in FIG. 23 and heated to fuse them together to form an integral substrate blank. In some cases, it is necessary to subdivide the components for ease of construction. For example, ridges 214, 216, 218 can be formed as two symmetrical halves to facilitate fabrication of etchable strips 308. Then, the substrate blank is heated to a temperature sufficient to soften it, and the substrate blank is drawn to increase its length and reduce its cross-sectional dimensions. When the desired dimensions are reached, the elongated substrate blank is cooled and is cut to suitable lengths to form substrate 302.

Figure 24:
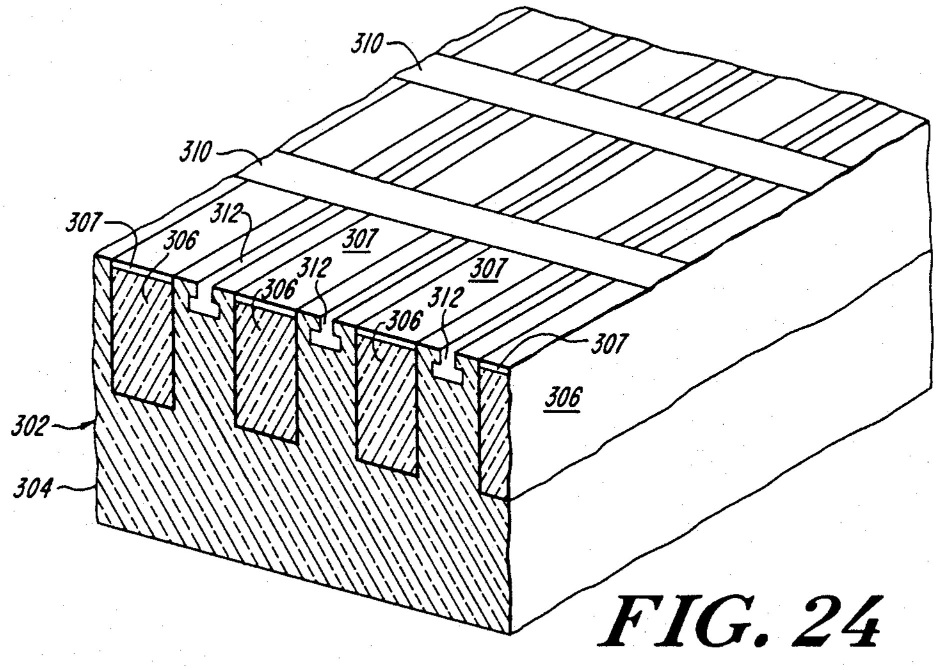

Referring now to FIG. 24, a photoresist layer is applied to the upper surface of substrate 302 and is patterned and etched using well known photolithographic techniques to form photoresist strips 310. The strips 310 are perpendicular to strips 306 and 308 and cover the regions of substrate 302 where C electrodes (FIG. 11) will later be formed. Next, the etchable strips 308 are etched to form channels 312 in substrate 302. In the regions covered by photoresist strips 310, strips 308 are not etched. As a result, the strips 308 remain in the portion of substrate 302 where the C electrodes will later be located. Also, the strips 306 are protected from etching during this step by layers 307 of nonetchable material. For etching of the above-identified example of etchable glass, a solution of 5% acetic acid and 2% HCl is preferably used. Now, the photoresist strips 310 are removed with a conventional photoresist solvent, leaving channels 312 interrupted at intervals along their lengths.

Figure 25:
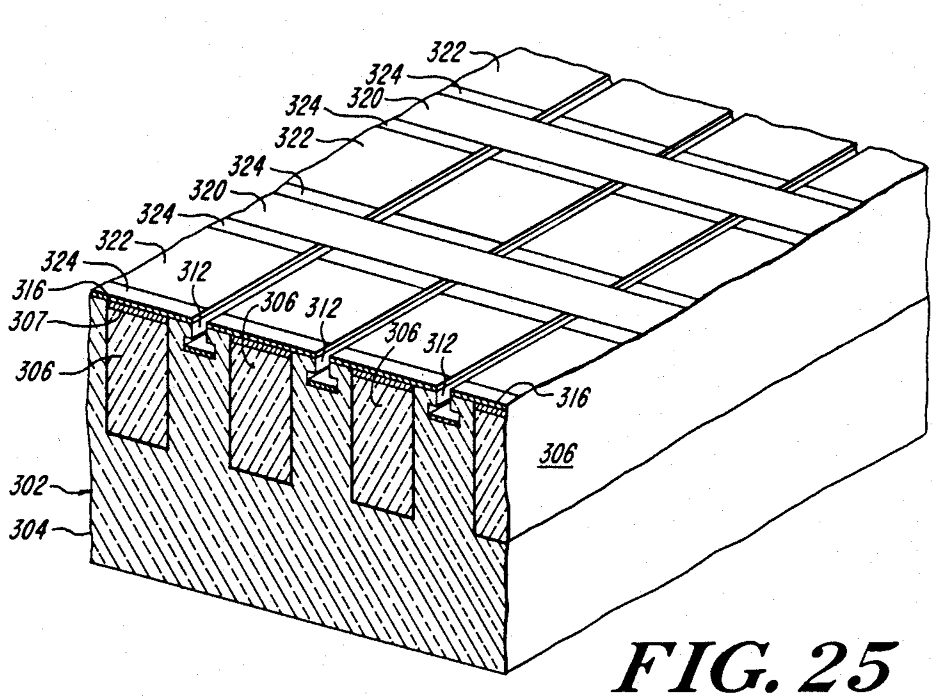

Next, aluminum is evaporated over the entire top surface of substrate 302 to form a thin conductive layer 316 as shown in FIG. 25. Photoresist is then applied over the aluminum layer and is patterned and etched using conventional photolithographic techniques so that photoresist is left on substrate 302 in the regions of the C electrodes and the B electrodes. After the photoresist patterning step, photoresist strips 320 corresponding to the C electrodes and photoresist strips 322 corresponding to the B electrodes remain on substrate 302. The photoresist strips 322 corresponding to the B electrodes can be patterned as continuous strips rather than discrete squares or rectangles, because the required separation between adjacent B electrodes is established by channels 312. Strips 324 between strips 320 and 322 are left unprotected by photoresist. Now the aluminum in strips 324 is etched, and photoresist strips 320 and 322 are removed with a photoresist solvent.

Figure 26:
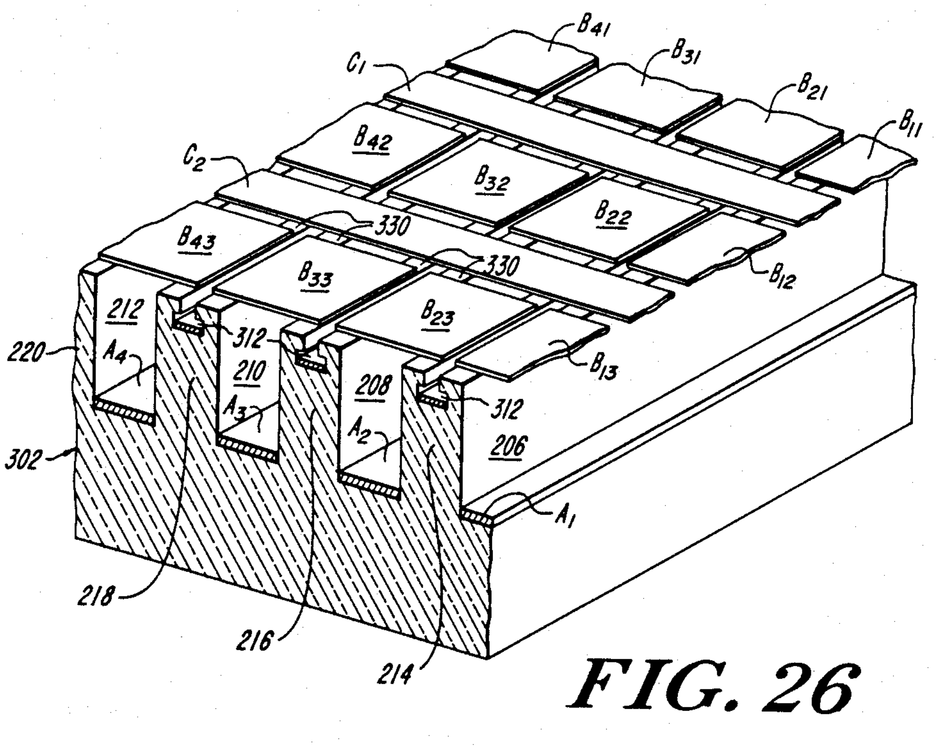

After the photoresist strips 320 and 322 are removed, the B and C electrodes are defined as shown in FIG. 26.

Adjacent B electrodes are separated from each other by channels 312 which interrupt the continuity of the aluminum that forms the B electrodes. The C electrodes are continuous since the channels 312 do not extend under them. Next, a very brief etch is performed with hydrofluoric acid to remove layers 307 in strips 324 that are not covered with aluminum layer 316. Typically, a 3% HF solution is used for about 20 seconds. Then, the parallel strips 306 are etched so as to define channels 206, 208, 210, 212 which undercut both the C electrodes and the B electrodes. The strips 306 can be etched with a solution of 5% acetic acid and 2% HCl. Both the B electrodes and the C electrodes span the respective channels 206, 208, 210, 212 and are supported by the ridges 214, 216, 218, 220 between the channels. After removal of strips 306, the remainder of layers 307 under the B and C electrodes is preferably removed by etching with hydrofluoric acid. Typically, a 3% HF solution is used for about 20 seconds.

Next, the surfaces of the B and C electrodes are lightly oxidized for protection, and the A electrodes are formed by a directional deposition, such as evaporation, of aluminum while rocking the substrate 302. This causes aluminum to be deposited through the spaces between the B and C electrodes into the respective channels 206, 208, 210, 212 to form electrodes $A_1$, $A_2$, $A_3$, $A_4$. The deposited aluminum also covers the top surface of the cell array and, in particular, causes an undesired conductive bridge between the B and C electrodes on unprotected surfaces 330. The surfaces 330 are portions of ridges 214, 216, 218, 220 that are not covered by either the B or C electrodes. The undesired aluminum connections on surfaces 330 are preferably removed by directional ion beam etching with the substrate 302 tipped relative to the ion beam direction in order to shadow and protect electrodes $A_1$l , $A_2$, $A_3$, $A_4$. The B and C electrodes remain intact after the ion beam etching process, even though a portion of their thickness is removed. The resulting cell array corresponds to the cell array shown in FIGS. 11–14 and described hereinabove.

It will be understood that readout techniques other than those described hereinabove can be utilized in connection with the cell array shown in FIGS. 11–14 and described hereinabove. In another readout technique, electrons are generated during the readout phase from one C electrode, such as electrode $C_1$, by illuminating the photocathode layer 14 along a line parallel to and aligned with electrode $C_1$. Secondary electrons emitted from electrode $C_1$ are caused to flow to electrode $C_2$ by biasing electrode $C_2$ one or two volts positive relative to electrode $C_1$ and by biasing the A electrodes a fraction of a volt negative relative to electrode $C_1$. In this case, electrons flow between electrodes $C_1$ and $C_2$, and the B electrodes between them control the current flow.

In yet another readout technique, the B electrodes are scanned by illuminating portions of the photocathode layer 14 so that electrons in addition to those generated during the exposure phase impinge on the B electrodes. During the exposure phase, a quantity of electrons flow from the B electrodes to the C or A electrodes, depending on the incident light intensity. During readout, the same process is continued so that if the B electrodes have not come to equilibrium by overexposure, then more electrons will flow when further exposure occurs. Thus, a scanning illumination spot on photocathode layer 14 causes additional electron flow that was not stimulated during exposure. This technique provides a readout current which is a constant (corresponding to the total secondary electron flow required to reach equilibrium) less the electron flow during exposure. Therefore, a reverse contrast readout is provided. One disadvantage of this readout technique is that it does not provide the amplification available with readout techniques where the B electrode voltage controls a readout current.

Figure 10:
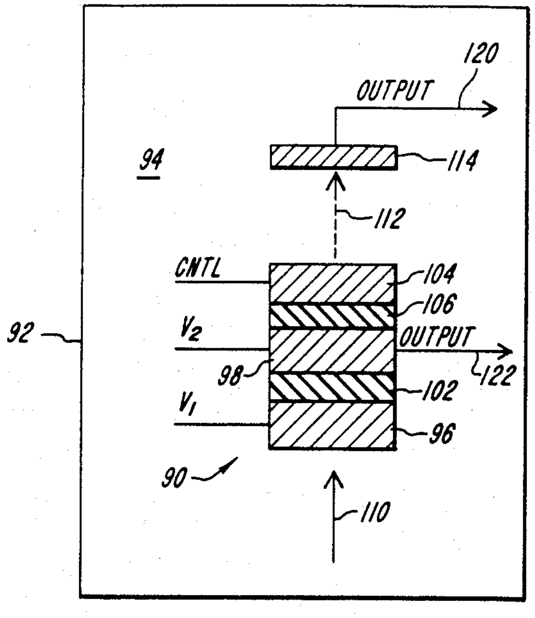
FIG. 10 is a simplified diagrammatic view of a tunnel device.

The readout current has been described hereinabove as generated by illuminating the A electrodes with ultraviolet radiation. It will be understood that other techniques can be utilized for generating the electrons that form the readout current. For example, the readout current can be obtained from a tunneling device as described hereinabove in connection with FIG. 10. In this instance, the tunneling device is used as a constant current source rather than a controlled current device. Therefore, layers 104 and 106 of the device shown in FIG. 10 are omitted, and tunneling electrons are injected from layer 98 into the vacuum region of the camera tube. The readout current corresponds to the current 112 shown in FIG. 10 and is controlled by the voltage on the adjacent B electrodes. The tunneling device can be utilized at the position of the A electrodes or at the position of the C electrodes.

Figure 27:
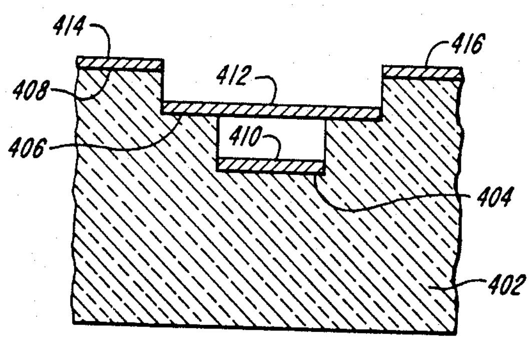
FIG. 27 is an enlarged, cross-sectional view of an alternative cell structure.

Alternative array structures are also included within the scope of the present invention. A cross-sectional view of one cell of a three-layer structure is shown in FIG. 27. A substrate 402, which can be glass as described hereinabove, is formed with a stepped structure which defines a lower level 404, an intermediate level 406 and an upper level 408. An A electrode 410 is formed on the lower level 404, a B electrode 412 is formed on intermediate level 406 and C electrodes 414 and 416 are formed on upper level 408. The B electrode 412 spans the channel in which A electrode 410 is formed. As in the above described embodiments, B electrodes 412 are pixels of the camera tube and are arranged in an array of rows and columns for accumulating a charge representative of an incident light intensity pattern. The above-described techniques for exposure, readout and reset can be applied generally to the structure shown in FIG. 27.

It will be apparent from the above description that the general features of the invention include an array of storage elements (B electrodes) capable of individually accumulating charges in response to electrons from a photocathode layer. The charge pattern on the elements of the array represents the light intensity pattern incident on the photocathode layer. Readout is preferably performed by generating a readout current comprising a flow of electrons through an evacuated space adjacent to each B electrode. Each readout current is influenced by the charge on the adjacent B electrode. The readout current is a function of the charge on the B electrode, which in turn is a function of the incident light intensity. Therefore, the readout currents from the storage elements of the array provide a representation of the incident light intensity pattern.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A camera tube comprising:

means for emitting electrons having a spatial variation representative of an incident light intensity pattern when exposed to light in a predetermined wavelength range;

an array of storage electrodes each capable of storing an electrical charge in response to said electrons from said electron emitting means;

means for accelerating electrons from said electron emitting means to said array of storage electrodes during exposure;

a sealed and evacuated envelope surrounding said electron emitting means and said array of storage electrodes; and readout means for sensing the charge on each of the storage electrodes in said array during a readout phase after exposure, said readout means comprising a readout device associated with each storage electrode in said array of storage electrodes, each readout device including means for generating a readout current in an evacuated region adjacent to the storage electrode, and means for collecting said readout current to provide a readout signal, each readout current having a magnitude that is a function of the charge on the adjacent storage electrode so that the readout signals collectively represent said charge pattern.

2. A camera tube as defined in claim 1 wherein the storage electrodes of said array are arranged in a rectilinear grid of rows and columns and wherein said means for generating a readout current comprises row electrodes respectively aligned with rows of storage electrodes and ultraviolet source means for directing ultraviolet radiation at said row electrodes.

3. A camera tube as defined in claim 2 wherein said ultraviolet source means includes means for illuminating all of the readout devices during readout and wherein said camera tube further includes means for selectively addressing said readout devices for sequential readout.

4. A camera tube as defined in claim 2 wherein said ultraviolet source means includes means for illuminating a selected row electrode with a line beam and means for sequentially scanning said line beam over said row electrodes, and wherein said camera tube further includes means for selectively addressing readout devices associated with the selected row electrode.

5. A camera tube as defined in claim 2 wherein said ultraviolet source means includes means for illuminating a selected row electrode with a line beam for parallel readout of a plurality of readout devices associated with the selected row electrode, and means for sequentially scanning said line beam over said row electrodes.

6. A camera tube as defined in claim 2 wherein said ultraviolet source means includes means for illuminating a selected readout device with a spot beam, and means for sequentially scanning said spot beam over all of the readout devices.

7. A camera tube as defined in any of claims 2-6 wherein said means for collecting said readout current includes column electrodes respectively aligned with columns of storage electrodes.

8. A camera tube defined in any of claims 2-6 wherein said means for collecting said readout current includes readout electrode means on the opposite side of said envelope from said array of storage electrodes.

9. A camera tube as defined in claim 1 wherein the cells of said array of storage electrodes are arranged in a rectilinear grid of rows and columns, wherein said means for generating a readout current includes row electrodes respectively aligned with rows of storage electrodes and ultraviolet source means for directing ultraviolet radiation at said row conductors and wherein said means for collecting said readout current includes column electrodes perpendicular to said row electrodes and respectively aligned with columns of storage electrodes, said row electrodes and said column electrodes being spaced apart in a direction perpendicular to the plane of said array of storage electrodes, said readout devices being defined at each crossover of a row electrode and a column electrode.

10. A camera tube as defined in claim 9 wherein said column electrodes and said array of storage electrodes are coplanar and are supported by a substrate, said substrate including parallel, spaced-apart channels under rows of storage electrodes in said array, said row electrodes being disposed in said channels.

11. A camera tube as defined in claim 10 wherein said channels define between them ridges that support said storage electrodes and said column electrodes.

12. A camera tube as defined in claim 10 wherein said substrate includes ultraviolet radiation transmissive regions aligned with and below said row conductors, said regions having a higher index of refraction than said substrate.

13. A camera tube as defined in claim 1 wherein said array of storage electrodes and said electron-emitting means are parallel to each other and are spaced apart within said envelope.

14. A camera tube as defined in claim 13 wherein said electron-emitting means comprises a photocathode layer.

15. A camera tube as defined in claim 14 wherein each of said storage electrodes comprise a conductive layer for emitting secondary electrons when bombarded by energetic primary electrons.

16. A camera tube comprising:

a photocathode layer for emitting electrons having a spatial variation representative of an incident light intensity pattern when exposed to light in a predetermined wavelength range;

an array of storage electrodes each for storing an electrical charge, said storage electrodes being arranged in rows and columns;

means for mounting said photocathode layer and said array of storage electrodes in closely-spaced, substantially parallel alignment;

a sealed and evacuated envelope surrounding said photocathode layer and said array of storage electrodes;

means for biasing the photocathode layer relative to said array of storage electrodes during exposure so that electrons emitted by said photocathode layer impinge on said array of storage electrodes and form thereon a charge pattern representative of said light intensity pattern;

row conductors respectively aligned with said rows of storage electrodes;

column conductors respectively aligned with said columns of storage electrodes, said row conductors and said column conductors being spaced apart in a direction perpendicular to said array of storage electrodes and defining readout devices at crossover regions thereof;

addressing means for selectively addressing said readout devices during a readout phase after exposure; and means for stimulating electron emission the row conductor of each addressed readout device to form a readout current, said readout current being influenced by the charge on the storage electrodes adjacent to the readout device so that the readout currents collectively provide an electronic representation of said light intensity pattern.

17. A camera tube as defined in claim 16 wherein said readout currents are collected by column conductors of the respective readout devices.

18. A camera tube as defined in claim 16 further including electrode means for receiving readout currents that are injected into the space between said storage electrodes and said photocathode layer.

19. A camera tube as defined in claim 18 wherein said electrode means for receiving readout currents comprises a readout electrode adjacent to said photocathode layer and means for biasing the readout electrode at a positive potential relative to the addressed readout device.

20. A camera tube as defined in claim 18 wherein said electrode means for receiving readout currents includes a plurality of conductive strips disposed within said envelope adjacent to said photocathode layer, said conductive strips being aligned perpendicular to said row conductors.

21. A camera tube as defined in claim 16 wherein said storage electrodes each comprise a thin conductive layer capable of emitting secondary electrons when bombarded by energetic primary electrons.

22. A camera tube as defined in claim 21 wherein said storage electrodes each comprise an aluminum layer having a thickness in the range of 0.1 micrometer to 0.5 micrometer.

23. A camera tube as defined in claim 16 wherein said means for stimulating electron emission comprises ultraviolet source means for directing ultraviolet radiation at selected row conductors.

24. A camera tube as defined in claim 16 wherein said column conductors comprise parallel strips coplanar with said storage electrodes and said row conductors comprise parallel strips spaced from said storage electrodes and said column conductors.

25. A camera tube as defined in claim 24 wherein said addressing means comprises means for biasing the row conductor of each addressed readout device at a positive potential relative to the most positive potential of said storage electrodes after exposure, and means for biasing the column conductor of each addressed readout device at a positive potential relative to the potential of the row conductor of each addressed readout device.

26. A camera tube as defined in claim 16 further including means for resetting each of said storage electrodes to a desired potential after said readout phase.

27. A charge pattern storage and readout device comprising:

an envelope defining an evacuated cavity;

an array of storage electrodes in said evacuated cavity, each capable of temporarily storing an electrical charge;

means for causing a charge pattern to be formed on said array of storage electrodes during a storage phase; and readout means for sensing the charge on each of the storage electrodes in said array during a readout phase after the storage phase, said readout means comprising a readout device associated with each storage electrode in said array, each readout device including means for generating a readout current in an evacuated region adjacent to the storage electrode, and means for collecting said readout current, said readout current having a magnitude that is a function of the charge on the adjacent storage electrode so that the readout currents collectively provide an electronic representation of said charge pattern.

28. A camera tube comprising:

means for emitting electrons having a spatial variation representative of an incident light intensity pattern when exposed to light in a predetermined wavelength range;

an array of storage electrodes each capable of storing an electrical charge in response to said electrons from said electron emitting means;

means for accelerating electrons from said electron emitting means to said array of storage electrodes during exposure;

a sealed and evacuated envelope surrounding said electron emitting means and said array of storage electrodes; and readout means for sensing the charge on each of the storage electrodes in said array during a readout phase after exposure, said readout means comprising a pair of readout electrodes associated with each of said storage electrodes and means for generating a readout current in an evacuated region between said readout electrodes, each pair of said readout electrodes being positioned relative to one of said storage electrodes such that the readout current is a function of the electrical charge on the associated storage electrode.

29. A camera tube as defined in claim 28 wherein each of said storage electrodes comprises a thin conductive layer capable of accumulating a net electrical charge in response to incident electrons.

* * * * *